(12) United States Patent
Okulov

(10) Patent No.: US 12,135,253 B2
(45) Date of Patent: Nov. 5, 2024

(54) UNIVERSAL AUTONOMOUS STRUCTURAL HEALTH MONITOR EMPLOYING MULTI SENSING INPUTS AND ON-BOARD PROCESSING

(71) Applicant: Paul D. Okulov, Ste-Anne-de-Bellevue (CA)

(72) Inventor: Paul D. Okulov, Ste-Anne-de-Bellevue (CA)

( * ) Notice: Subject to any disclaimer, the term of this patent is extended or adjusted under 35 U.S.C. 154(b) by 962 days.

(21) Appl. No.: 17/048,598

(22) PCT Filed: Apr. 17, 2019

(86) PCT No.: PCT/IB2019/053157
§ 371 (c)(1),
(2) Date: Jun. 3, 2021

(87) PCT Pub. No.: WO2019/202520
PCT Pub. Date: Oct. 24, 2019

(65) Prior Publication Data
US 2021/0318191 A1  Oct. 14, 2021

Related U.S. Application Data

(60) Provisional application No. 62/659,051, filed on Apr. 17, 2018.

(51) Int. Cl.
*G01L 1/22* (2006.01)
*G01M 5/00* (2006.01)
(Continued)

(52) U.S. Cl.
CPC .......... *G01L 1/2293* (2013.01); *G01L 1/2206* (2013.01); *G01L 1/2262* (2013.01);
(Continued)

(58) Field of Classification Search
CPC ... G01L 1/2293; G01L 1/2206; G01L 1/2262; G06F 1/263; G06F 1/3206; G06N 3/02
(Continued)

(56) References Cited

U.S. PATENT DOCUMENTS 7,302,866 B1 * 12/2007 Malkin ................. B06B 1/0696
73/862.041
2006/0288795 A1 * 12/2006 Kieffer ................. G01L 1/2287
73/795
(Continued)

FOREIGN PATENT DOCUMENTS

CN          203657941 U  *  6/2014

*Primary Examiner* — Herbert K Roberts
(74) *Attorney, Agent, or Firm* — Muncy, Geissler, Olds & Lowe, P.C.

(57) ABSTRACT

The present invention relates to structural health and usage monitoring systems, particularly employing strain sensing means for assessment of the loading history and fatigue damage in an aircraft, vessel, structure or machinery. More specifically, the present invention relates to autonomous systems for recording, processing and assessment of the history of a variety of mechanical and environmental factors affecting structural health in a wide spectrum of applications, such as in mechanical components of a fixed wing or a rotary aircraft, civil structures, machines, windmills, gas or oil pipes and vessels including marine vessels. It also can work as a standalone or integrated sensor or recording device for use in variety of applications where its ultralow power consumption, low cost and multi-sensing capabilities can provide for accurate assessments based on neural network principles of data processing and autonomous monitoring for many years without a need for maintenance or post-processing.

32 Claims, 11 Drawing Sheets

(51) Int. Cl.
 *G06F 1/26* (2006.01)
 *G06F 1/3206* (2019.01)
 *G06N 3/02* (2006.01)

(52) U.S. Cl.
 CPC .......... *G01M 5/0041* (2013.01); *G06F 1/263* (2013.01); *G06F 1/3206* (2013.01); *G06N 3/02* (2013.01)

(58) Field of Classification Search
 USPC .......................................................... 73/777
 See application file for complete search history.

(56) References Cited

U.S. PATENT DOCUMENTS

2011/0240621 A1* 10/2011 Kessler .................... H01B 1/02
 73/647
2012/0253698 A1* 10/2012 Cokonaj ............... B06B 1/0622
 702/39
2017/0363486 A1* 12/2017 Okulov ............... G01M 5/0033
2021/0228153 A1* 7/2021 DeCerce ................ A61B 5/686
2021/0262888 A1* 8/2021 Littlestar ................. H04W 4/80

* cited by examiner (Prior Art, PCT/IB2015/059451)

ASHM (IPR Inc.)

1-Axis Strain Sensor
(Columbia Labs)

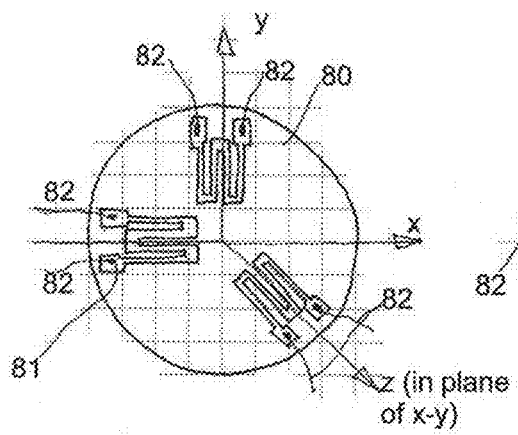
Fig. 19
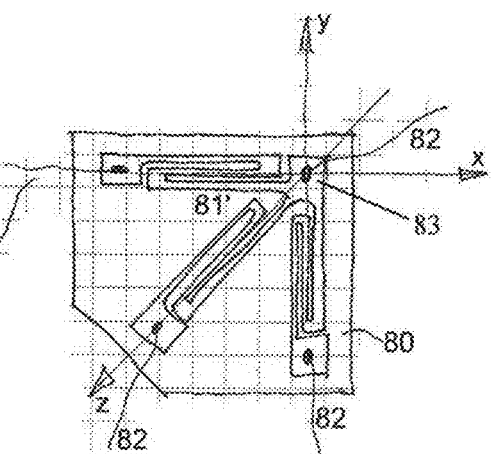
Fig. 20
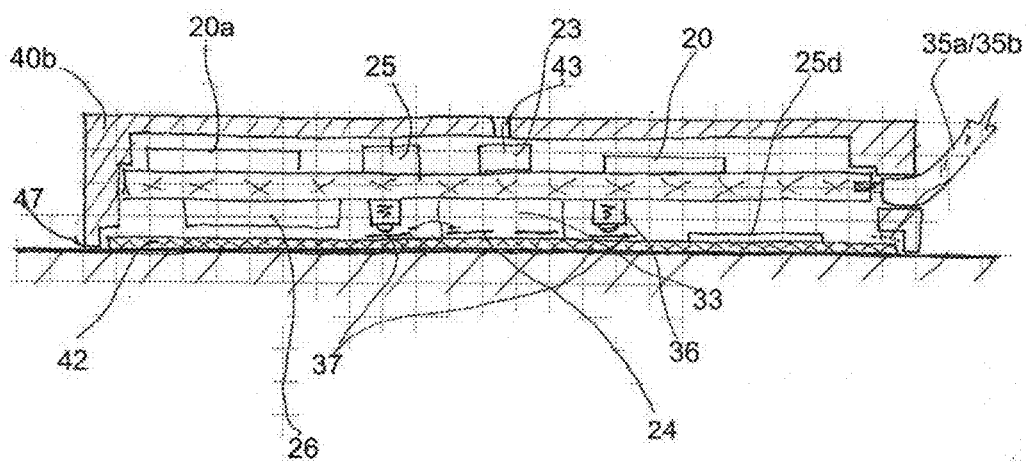
Fig. 21
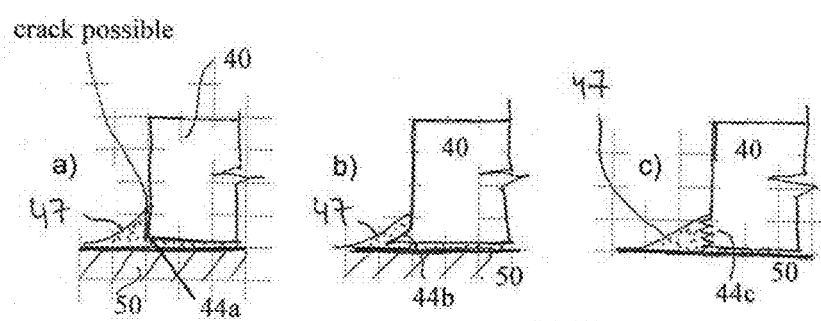
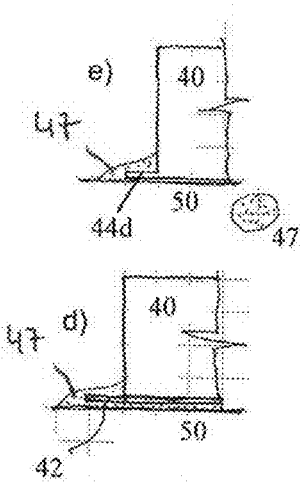
Fig. 22

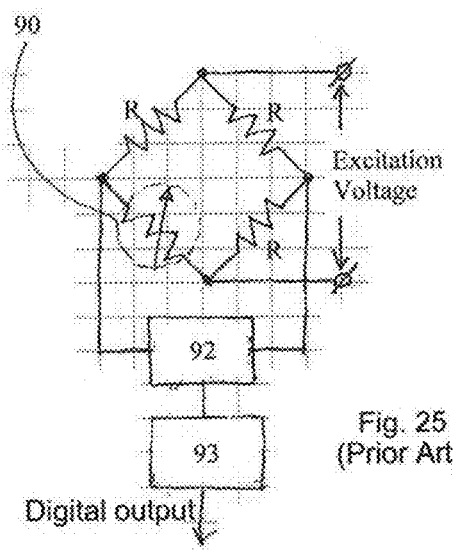
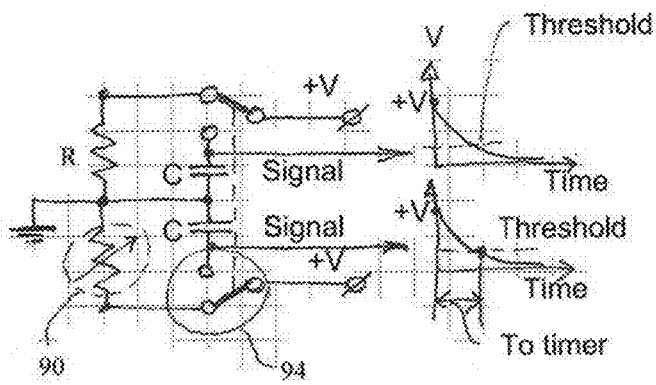
Fig. 25
(Prior Art)
Fig. 26
(Prior Art)
"Pico Strain"
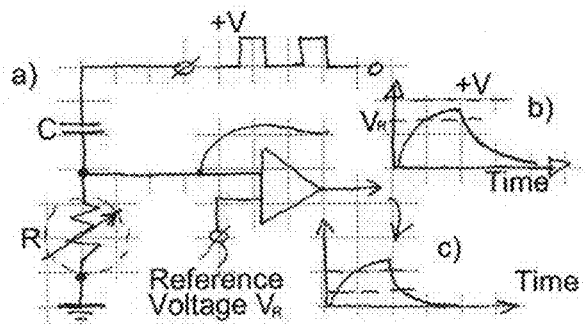
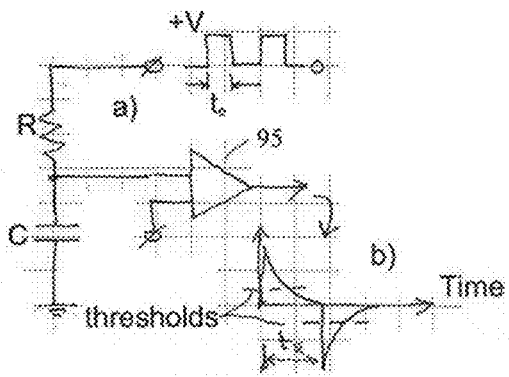
Fig. 27
Fig. 28
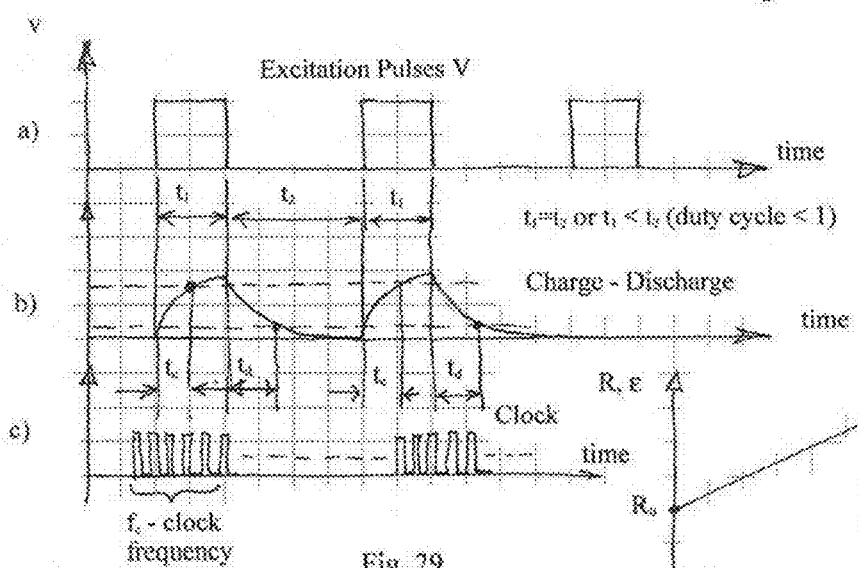
Fig. 29
Fig. 30

Fig. 31
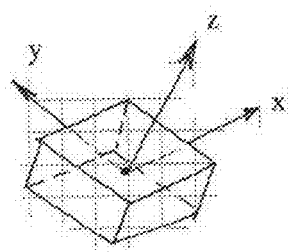
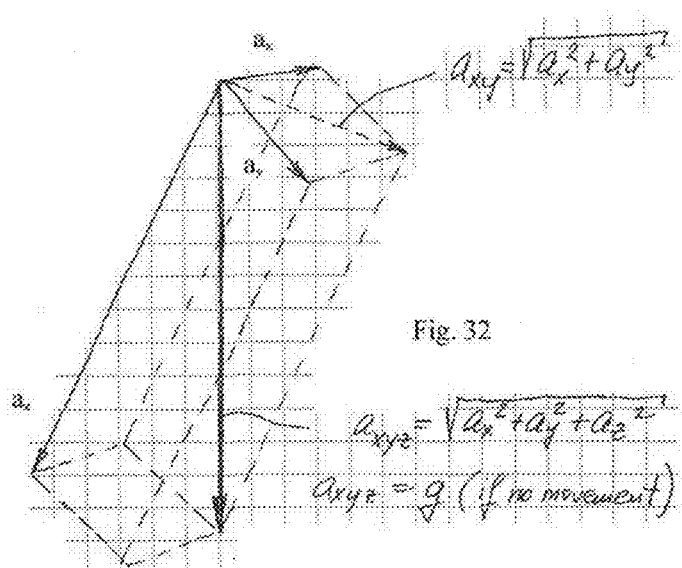
Fig. 32
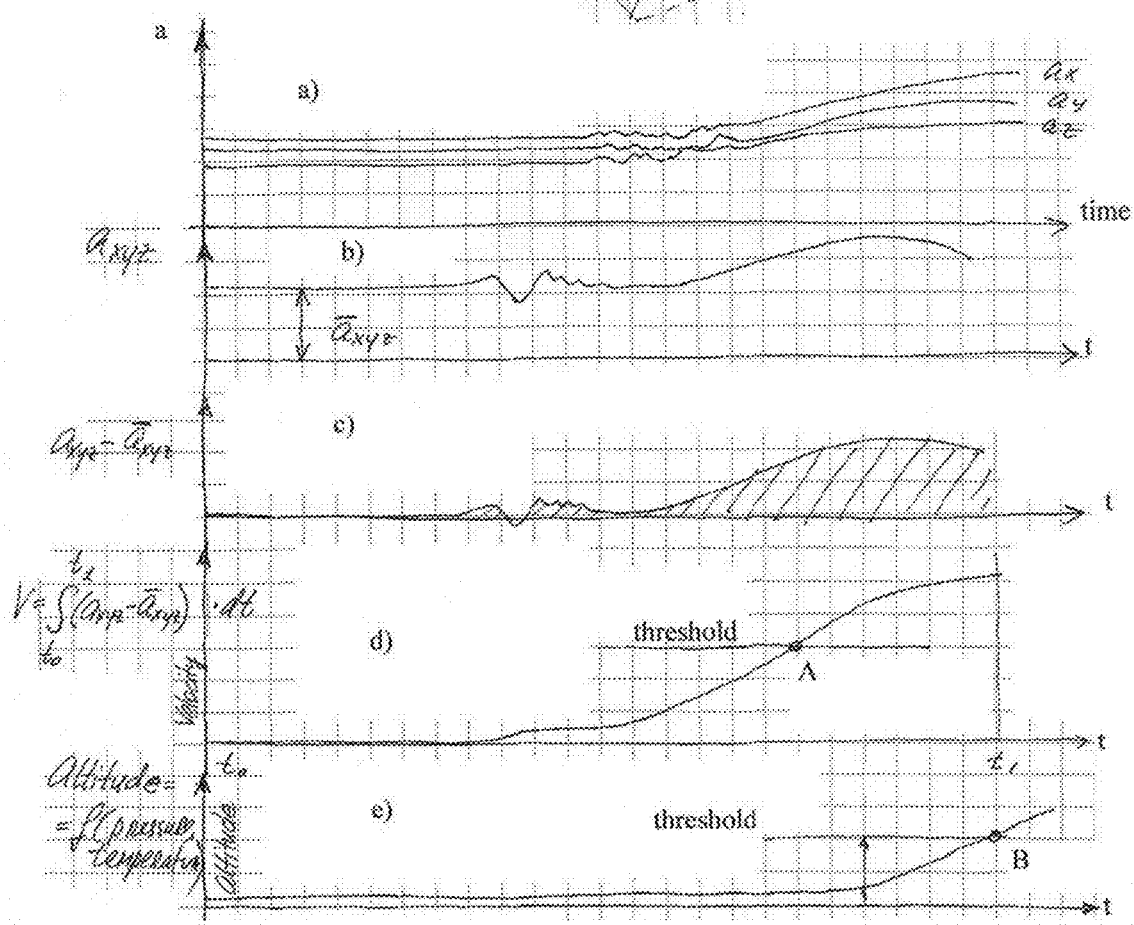
Fig. 33

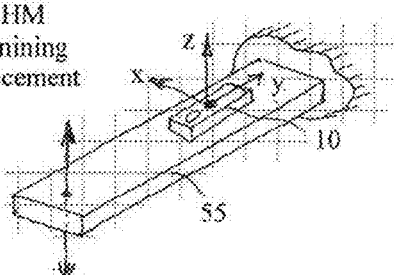
Fig. 37
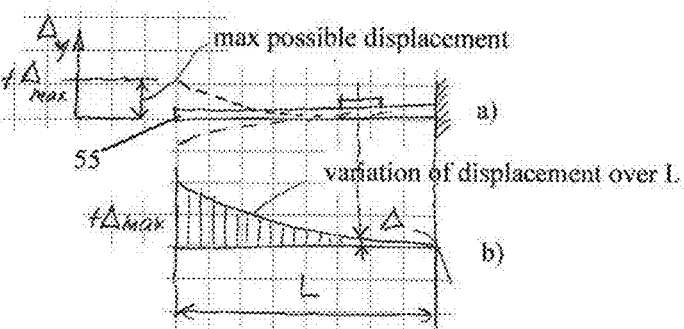
Fig. 38
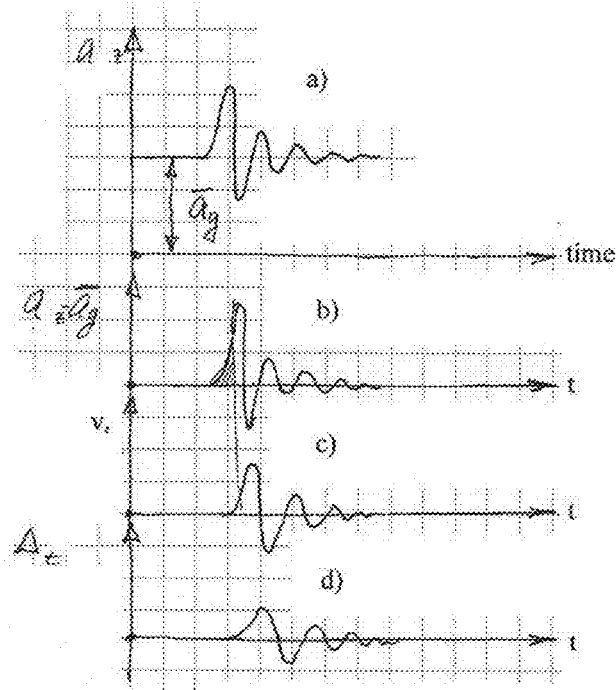
Fig. 39
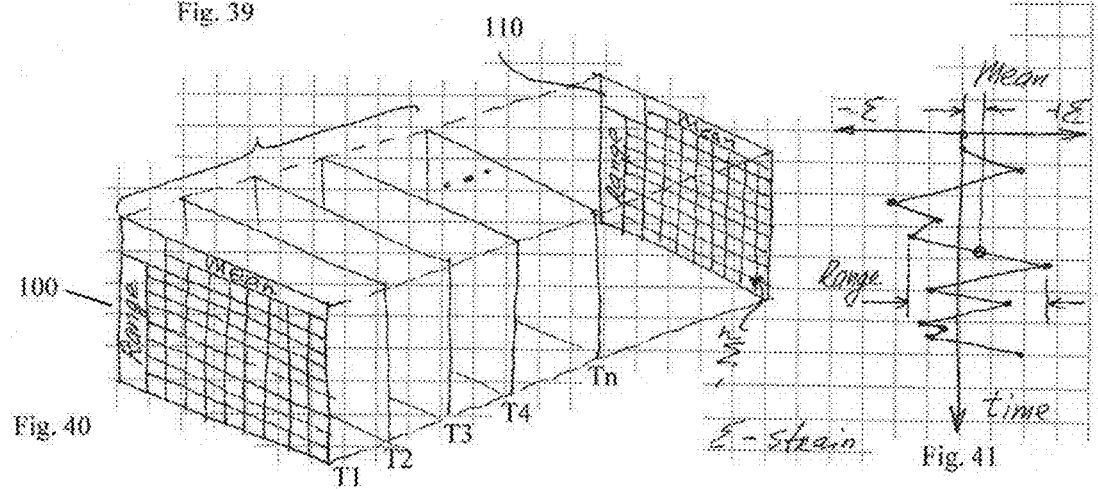
Fig. 40
Fig. 41

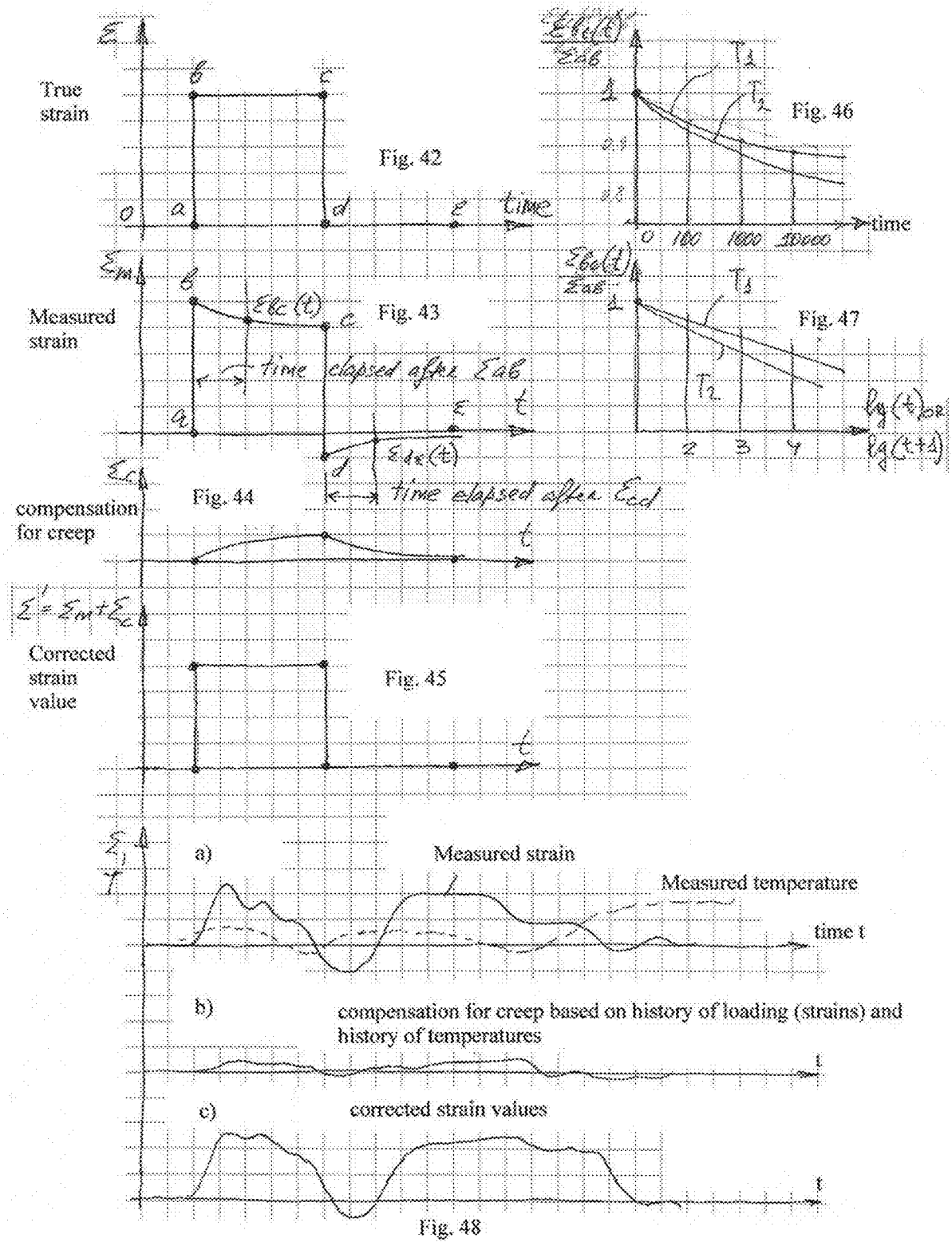

UNIVERSAL AUTONOMOUS STRUCTURAL HEALTH MONITOR EMPLOYING MULTI SENSING INPUTS AND ON-BOARD PROCESSING

This application claims priority to U.S. Provisional Application No. 62/659,051, filed on Apr. 17, 2018, the contents of which are incorporated herein by reference in its entirety.

TECHNICAL FIELD

The present invention relates to structural health and usage monitoring systems, particularly employing strain sensing means for assessment of the loading history and fatigue damage in aircrafts. More specifically, the present invention relates to autonomous systems for recording, processing and assessment of the history of a variety of mechanical and environmental factors affecting structural health in a wide spectrum of applications, such as in mechanical components of a fixed wing or a rotary aircraft, civil structures, machines, windmills, gas or oil pipes and vessels including marine vessels. It also can work as a stand-alone or integrated sensor or recording device for use in variety of applications where its ultra-low power consumption, low cost and multi-sensing capabilities can provide for accurate assessments based on neural network principles of data processing and autonomous monitoring for many years without a need for maintenance or post-processing.

BACKGROUND ART

In the aviation industry safety rules require that aircraft components are constantly monitored for fatigue as these components are subjected to a large number of significant and prolonged mechanical stresses (or load spectrums). Accordingly, these components are subjected to overhauls on a regular and recurrent basis. A number of specific components can conceivably benefit from one of the sensor's configuration capable of detecting maximum loads and therefore providing valuable information on effects of hard landing and other overloading conditions which are difficult to deduct from presently known flight recording apparatuses.

In civil structures such as buildings, bridges, overpasses, dams, oil reservoirs, pressure vessels and towers knowing the history of strain experienced by the structures can present valuable information for assisting in predicting the maximum stochastic loads and the remaining working life of the structure as well as assisting in assessing the integrity of the structure.

Such information could also assist civil engineers conducting investigations related to determining the necessity of structural reinforcements in order to address the effects of climatic changes (i.e.: both static and dynamic loads in the form of wind, snow, water levels, among other loads that will be readily appreciated by the skilled person), urban changes (such as increasing the magnitude of transport loads on a bridge or roadway) and technological process changes (which can lead to increased loads due to adding overhead cranes, conveyors, etc.) on industrial buildings and other articles of civil infrastructure.

When structures are tested in a laboratory environment in order to monitor strain or displacement there are a number of limitations (including space limitations and/or limitations to the number of available data logging channels) that could be overcome by using simple and inexpensive autonomous and self-contained recording gauges.

Additionally, such environmental parameters as humidity, pressure, temperature, gas analysis and mechanical parameters such as acceleration, vibration and displacement and combination thereof are influencing the overall state of the structural health (for instance creating corrosive environment, causing excessive vibration or abnormal response of the structure to vibration due to composite delamination, cracks in metals, etc.) are an important and necessary source of information for accurate assessment of the overall structural health.

For an overall review of prior art solutions for structural health monitoring systems and sub-systems in a variety of industrial and commercial applications, the reader is directed to the following academic and patent publications:

Z. Li and N. Tien, "Low-Cost Electroplated Vertical Comb-Drive", Berkeley Sensor and Actuator Center, Department of Electrical and Computer Engineering, University of California, Davis, CA;

United States Patent Publication No. 2012/0035864 to Frydenhal—Determining an Equivalent Mechanical Load;

U.S. Pat. No. 8,600,611 to Seize—System and Method for Measuring Fatigue for Mechanical Components of an Aircraft and Aircraft Maintenance Method;

Multiple Authors, "Aging Aircraft Fleets: Structural and Other Subsystem Aspects", North Atlantic Treaty Organization, Research and Technology Organization, Neuil-lySur-Seine Cedex, France, presented 13-16 Nov. 2000 in Sofia, Bulgaria;

U.S. Pat. No. 7,148,579 to Pinkerton et al. —Energy Conversion Systems Utilizing Parallel Array of Automatic Switches and Generators;

S. Willis, "Next Generation Data Acquisition Technologies for Aging Aircraft", ACRA CONTROL, Dublin, Ireland, 7th DSTO International Conference on Health & Usage Monitoring;

A. C. J. Glover, "Non-Destructive Testing Techniques for Aerospace Applications", Inspection and Maintenance Systems Division, Olympus Australia Pty Ltd, Victoria, Australia;

U.S. Pat. No. 7,928,343 to King et al. —Microcantilever HeaterThermometer with Integrated Temperature-Compensated Strain Sensor;

U.S. Pat. No. 7,839,028 to Pinkerton et al. —Nanoelectromechanical Systems and Methods for Making the Same;

U.S. Pat. No. 5,910,837 to Gimzewski—Photomechanical Transducer;

United States Patent Publication No. 2010/0176898 to Kihara—MEMS Device and Method for Manufacturing the Same;

T. L. Haglage, "Flight Test Evaluation of a Scratch Strain Gage", Air Force Flight Dynamics Laboratory (FDTR), Wright-Patterson Air Force Base, Ohio;

United States Patent Publication No. 2007/0062299 to Mian et al. —MEMS-based Monitoring;

U.S. Pat. No. 5,780,727 to Gimzewski—Electromechanical Transducer;

U.S. Pat. No. 5,936,411 to Jacobsen et al. —Apparatus and Method for Measuring Strain within a Structure;

U.S. Pat. No. 6,492,820 to Adachi et al. —Displacement Measuring Device;

U.S. Pat. No. 7,412,899 to Mian et al. —MEMS-based Monitoring;

U.S. Pat. No. 7,832,281 to Mian et al. —MEMS-based Monitoring;

U.S. Pat. No. 6,480,792 to Prenderast—Fatigue Monitoring Systems and Methods Incorporating Neural Networks;

D. M. Vidrine, "A Sequential Strain Monitor and Recorder for Use in Aircraft Fatigue Life Prediction", Naval Postgraduate School, Monterey, California;

K. L. Singh and D. V. Venkatasubramanyam, "Techniques to Generate and Optimize the Load Spectra for an Aircraft", Structural Technologies Division, National Aerospace Laboratories, Bengaluru, India, 3rd International Conference on Integrity, Reliability and Failure, Porto/Portugal, 20-24 Jul. 2009;

L. Molent and B. Aktepe, "Review of fatigue monitoring of agile military aircraft", Aeronautical and Maritime Research Laboratory, Defence Science and Technology Organisation, Victoria, Australia;

S. Ariduru, "Fatigue Life Calculation by Rainflow Cycle Counting Method", The Graduate School of Natural and Applied Sciences of Middle East Technical University;

C. Martin, "A Review of Australian and New Zealand Investigations on Aeronautical Fatigue During the Period Between April 1995 to March 1997", Airframes and Engines Division, Aeronautical and Maritime Research Laboratory, Defence Science and Technology Organisation, Victoria, Australia;

L. Molent, "Proposed Specifications for an Unified Strain and Flight Parameter Based Aircraft Fatigue Usage Monitoring System", Airframes and Engines Division, Aeronautical and Maritime Research Laboratory, Defence Science and Technology Organisation, Victoria, Australia;

D. E. Gordon, S. B. Kirschner and S. D. Manning, "Development of Fatigue and Crack Propagation Design & Analysis Methodology in a Corrosive Environment for Typical Mechanically-Fastened Joints", General Dynamics Corporation for Naval Development Center, Department of the Navy;

U.S. Pat. No. 7,680,630 to Schmidt—Monitoring A Parameter with Low Power Consumption for Aircraft Landing Gear-Data Logger;

United States Patent Publication No. 2009/0319102 to Winterhalter et al. —Flight Recorder Having Integral Reserve Power Supply Within Form Factor of Enclosure and Method Therefor;

S. W. Arms, C. P. Townsend, D. L Churchill, S. M. Moon and N. Phan, "Energy Harvesting Wireless Sensors for Helicopter Damage Tracking", American Helicopter Society International Inc., proceedings of AHS International Forum 62,HUMS III session, Phoenix, AZ, May 11, 2006;

K. Matsumoto, K. Saruwatari and Y. Suzuki, "Vibration-Powered Battery-less Sensor Node Using MEMS Electret Generator", Department of Mechanical Engineering, The University of Tokyo, Tokyo, Japan, TechnoDesign Co., Ltd, Kumamoto, Japan;

DSTO International Conference on Health and Usage Monitoring, Aeronautical and Maritime Research Laboratory, Defence Science and Technology Organisation, Victoria, Australia, presented in Melbourne, Feb. 19-20, 2001;

J. H. Galbreath, C. P. Townsend, S. W. Mundell, M. J. Hamel, B. Esser, D. Huston, S. W. Arms, "Civil Structure Strain Monitoring with Power-Efficient, High-Speed Wireless Sensor Networks", MicroStrain, Inc., Williston, VT, University of Vermont, Dept. Of Civil & Mechanical Engineering, Burlington, VT, USA, Presented at 4th Int'l Workshop on Structural Health Monitoring Stanford University, Stanford CA, Sep. 15-17, 2003;

S. W. Arms, C. P. Townsend, J. H. Galbreath, S. J. DiStasi, D. Liebschutz, and N. Phan, "Flight Testing of Wireless Sensing Networks for Rotorcraft Structural Health and Usage Management Systems", MicroStrain, Inc., Williston, VT, USA, Navy/NAVAIR, Structures Division, Patuxent River, MD, 7th DSTO International Conference on Health & Usage Monitoring;

D. A. Howell and H. W. Shenton III, "System for In-Service Strain Monitoring of Ordinary Bridges", JOURNAL OF BRIDGE ENGINEERING © ASCE, November/December 2006;

K. A. Jason and K. Surya, "A Survey of Health and Usage Monitoring System in Contemporary Aircraft", International Journal of Engineering and Technical Research (IJETR), ISSN: 2321-0869, Volume-1, Issue-9, November 2013;

M. Neumair and W. Luber, "Structural Health Monitoring For Military Aircraft Considering Vibration", EADS Deutschland GmbH, Munich, Germany;

H. Murayama, D. Wada, and H. Igawa, "Structural Health Monitoring by Using Fiber-Optic Distributed Strain Sensors With High Spatial Resolution", School of Engineering, The University of Tokyo, Tokyo, Japan, Japan Aerospace Exploration Agency, 6-13-1 Ohsawa, Mitaka, Tokyo, 181-0015 Japan, Photonic Sensors (2013) Vol. 3, No. 4: 355-376;

S. Maley J. Plets and N. D. Phan, "US Navy Roadmap to Structural Health and Usage Monitoring—The Present and Future", Structures Division, Naval Air Systems Command, Patuxent River, MD, American Helicopter Society International, Inc., presented at the American Helicopter Society 63rd Annual Forum, Virginia Beach, VA, May 1-3, 2007;

U.S. Pat. No. 5,421,204 to Svaty, Jr. —Structural Monitoring System;

U.S. Pat. No. 8,618,928 to Weed et al. —System and Methods for Wireless Health Monitoring of a Locator Beacon which Aids the Detection and Location of a Vehicle and/or People;

United States Patent Publication No. US 2013/0278377 to Slupsky et al. —Wireless Sensor Device; and S. Mahlknecht, J. Glaser and T. Herndl, "PAWIS: Towards a Power Aware System Architecture for a SOC/SIP Wireless Sensor and Actor Node Implementation", Institute of Computer Technology, Vienna University of Technology, Vienna, Austria, Infineon Technologies Austria AG, Vienna, Austria.

In aerospace applications, the components used to attach the propulsion system (i.e.: the turbo-jet engines) to the airplane as well as components such as wings, landing gears and critical parts of the fuselage are subjected to strict systematic inspections. Each overhaul requires removing the airplane from service in order to access or remove critical parts in order to carry out these tests.

To address these issues, Health and Usage Monitoring Systems (HUMS) have been developed that utilize data collection and analysis techniques to help ensure availability, reliability and safety of vehicles, specifically commercial vehicles such as aircraft and trains.

The importance and benefits of structural health monitoring are well-known and clearly evident and include significant risk reduction, particularly in instances of severe usage of an aircraft, and the potential prolongation of the life of an aircraft when the measured usage spectrum is in fact less intense than the designed usage spectrum. Particularly, HUMS can significantly reduce scheduled maintenance, aborted missions and maintenance test flights in both fixed and rotary aircraft applications (i.e.: airplanes and helicopters).

Historically, fatigue prediction methodologies were an important part of an aircraft's safety and maintenance programs. For example, U.S. Pat. No. 8,600,611 to Seize teaches that the frequency of the overhauls is determined in advance and an overhaul is carried out on expiration of each preset time period (for example every 2600 flight cycles: takeoff—flight-landing), irrespective of the real state of fatigue of the component. Seize contemplates avoiding any risk that can arise when an overhaul is undertaken too long after a fatigue state develops and an intervention, such as a repair or a replacement of the component, is required. Seize also provides that this relevant time period must be selected (either through computation or empirical analysis) based on the minimum period beyond which there is a risk that the component will fail, even if this risk remains statistically marginal.

This selected minimum period therefore corresponds to situations where the specific components are subjected to accidental, over-the-limit stresses; accordingly, many overhauls are carried out on components that could have been used without danger for longer since they have not been subjected to accidental stresses. Finally, in the absence of analysis of the real stresses to which a component has been subjected, the worstcase scenario is always taken with respect to the possible damage that has occurred to the component, which can lead to overhauls that are often conducted prematurely.

Moreover, frequent overhauls can also introduce the additional possibility that an error may occur during re-assembly of the overhauled component during reinstallation.

In some instances, data is collected by the inertial forces sensing unit of the airplane to determine whether the airplane has been subjected to exceptional stresses (such as a hard landing), however it can be difficult and costly to deduct an accurate and representative picture of the overloading of a variety of the components due to the sheer complexity of the overall mechanical system and the variance of the loading conditions, thereby resulting in a less accurate fatigue prediction.

The devices with desired functionality can be composed of existing technological elements.

For instance, the strain can be captured by resistive strain gauges, however a conventional thermally compensated circuit will preferably require four strain gauges per one channel. With typical strain gauge resistance of 300 Ohms and excitation voltage 10 VDC the current consumption of the gauge circuit itself will be 33 mA. To obtain a full picture of strain distribution on a planar surface at least three strain directions must be assessed, that bring the overall current consumption of the gauges to 100 mA and power consumption to 1 W. Apart from A/D converter, signal conditioner and other electronic circuits if such a solution is deployed it will require a battery or a power source of 87.6 kW*hour for functioning autonomously for 10 years. A battery of this capacity will weight over 20 kg. This makes the conventional technology prohibitive and costly.

On the other hand, energy harvesting solutions presently emerging are offering sizeable solutions (herein we should be discarding possibility of using light as a source of energy as most of locations for this type of measurement devices would be in confined sections of a structure) would be, generally speaking, feasible for power consumption less than 10 mW, which again would not be achievable with conventional technology for strain sensing.

There is therefore a need for a very low power consumption strain sensing solution allowing at the same time working at high sampling rates necessary for accurate recognition of dynamic loads and strains.

Turning now to analog-digital converter let's take as an example the AD7710 produced by Analog Devices. This device provides A/D conversion at 1000 Hz sampling rate and for two channels consumes 20 mW of power in active mode and 7 mW in sleep mode. Given the device has to have at least three strain channels, an equivalent circuit will consume 30 mW of power in active mode and 11 mW in sleep mode.

Typical data logger (for instance SG-Link-LXRS by MicroStrain) will require another 30 mW of power (apart from the power consumption required for wireless communication).

The problem with data logging using conventional technology also lies within limited size of the memory, therefore reducing a potential time of recording and dramatically increasing the download time. As an example, at a sampling rate of 1000 Hz and 10 bit resolution the continuous recording of three strain channels for 10 years will yield 9.5 Tera Bits of information which will take at least 16 hours to download at 20 MB/s speed (typical for flash drives).

The above provides an insight on how dramatically the scope of potential applications is reduced if the structural health monitor is constructed merely from a combination of conventional devices or known technologies.

One of the major ways of reducing power consumption is to put the monitoring and MCU processing to sleep and wake up the system only when meaningful information is available (a flight of an aircraft, loading of a structure, exceedance of pre-set thresholds, etc.). For each particular application the amount of inputs required to positively affirm such conditions is different, which require customization of the electronic components and software configuration for each desired instance of use. This makes technology more expensive, bulky and time consuming to educate technical personnel on such a variety of hardware configurations, which increases the its overall cost and makes it prohibitive for mass deployment. Present state of ageing aircraft fleet designed many years ago and ageing infrastructures as well as recent climate changes make loading conditions previously considered to be a predictable stochastic (stationary) processes make situation with design for or an assessment of structural integrity difficult to manage. In other words, there is presently a need for continuously monitoring of a great number of structures for detection of overloading conditions, fatigue and corrosive damage and implementation of predictive maintenance based on factual information. Moreover, there are still many instances when an aircraft or a structure are overdesigned or actual loading history allows for an extension of its life, which is a very economical solution and, again, can only be implemented based on factual information.

Therefore, there is a need for an ultra-low power consumption, low cost universal purpose use, portable, autonomous and self-contained multi-sensory structural health monitor capable of recording and storing processed as well as raw data/information logging relating to all factors affecting the potential structure of interest, including but not limited to history of all stresses and environmental effects experienced by a particular component and the resulting effects of these stresses on structural damage.

Referring to FIG. 1, PCT/IB2015/059451 to the present inventor P. Okulov teaches a structural health monitor having a multi-contact discrete MEMS displacement sensor which provides for automatic discrimination of threshold levels dividing the overall strain into a number of levels predetermined by the gaps between contacting plates. This sensor employs an MCU and memory means assisting data processing and storage, particularly strain signals processed using Rain-Flow algorithm or alike. In one particular embodiment it is contemplated that the invention can provide a device that can be easily attachable to the underlying support structure, is operable in an autonomous mode in a broad range of temperatures and humidity and can store information without the need for any external device for an extended period with the possibility of easy retrieval of said data through wireless means or a simple wired interface. Yet, apart from a waking up signal coming from strain related events, the invention does not teach using multi-sensing capabilities to recognize a wake-up state for variety of possible uses.

SUMMARY OF INVENTION

Technical Problem

There is an acute problem of unknown history of strain/stress and environmental effects affecting structures in a variety of loading conditions and prohibiting proper evaluation of structures' integrity and prediction of its fatigue and corrosion life.

The objective of present invention is to provide a portable, low weight, ultra-low power consumption and cost-effective solution for autonomous strain data acquisition and its processing on-board as well as storing and/or processing of such factors as relative humidity, temperature, vibration and barometric pressure and providing for data retrieval in processed format allowing for quick and direct estimate of the history of the loading/health of a structure and assessment of its integrity and prediction of fatigue life which can provide for a valuable tool assisting in reduction of maintenance costs as well as costs of non-destructive testing or visual inspections and assuring the increased reliability and safety of the structure.

Solution to Problem

According to a preferred embodiment of the present invention, it provides an autonomous structural health monitor (or ASHM) contained in a miniature housing (typically of 4 grams or less of weight, having a footprint of less than 3.5 cm$^2$ and providing for maximum power consumption of no more than 6.5 mW or 1.8 mA @ 3.6 VDC), which has at least one side (bottom, for instance) with elastic properties that can be glued to a surface of a structure, at least one strain sensor or strain sensing channel, an environmental sensor, which may include, but not limited to a temperature sensor having a thermally conductive connection to the strain sensor, relative humidity sensor, 3-axial accelerometer and barometric pressure sensor, all incorporated into said housing and hermetically sealed except for the input channel of the relative humidity and pressure sensors. The sensor can have an internal or external power source, power management circuit providing for a stable supply to the strain sensor/s excitation circuits, non-volatile memory (preferably of F-RAM type), microcontroller unit (MCU) with clock frequency of at least 1.0 MHz, real time clock oscillator for precise time stamps and a variety of interfaces (serial, parallel, wireless or near field magnetic, RF, optical or surface acoustic wave).

In one preferred configuration, the ASHM employs only a single strain gauge per one strain sensing channel wherein corrections for temperature and apparent strains are executed by the MCU based on readings from the temperature sensor, time delays due to thermal inertia and thermal expansion coefficients of the materials tested and also material used in construction of the sensor housing, strain gauges substrates and gauges itself, etc.

In another preferred embodiment, the ASHM has a rosette of at least three strain gauges positioned at angles relative to each other in the plane of the measured strain (or, for 3D strain measurements, the strain sensing means can be also applied to other than structure surfaces' planes).

In one particular embodiment, each strain channel data can be fed into processing algorithm which can include data logging, processing per Rain-Flow algorithm or alike for fatigue analysis and damage estimate, as well as the principal strains and their angles (relative to the axis of the sensor) can be calculated and further processed.

The preferred embodiment can further contain a gyroscope and/or a GPS circuit for determination of the position of the sensor. The accelerometer can be used to calculate velocity and displacement or distance by integrating the readings from three axes as well it can be used for determination of the movement of the structure carrying the sensor and assist in power reduction by activation of data logging/processing only when change of status occurs, i.e. by determining when the plane is in flight, or by determining when a train is approaching the bridge, etc. Accordingly, the signal input/s from the accelerometer can also serve as information used for determination of the end of flight or a loading event.

Another preferred embodiment deals with using multiple inputs from the sensor sensing means for determination of pre-defined conditions. For instance, barometric pressure sensor can indicate change in altitude of a plane, in combination with data from accelerometer it can assist in positive identification of a flight condition. The multiple data inputs can serve as inputs for processing information using neural network approach and increasing sensor accuracy, reduction of power consumption and assessing the integrity or fatigue state of the structure.

Yet another preferred embodiment includes the method for sensor individual calibration (not unlike MEMS pressure sensors which undergo individual calibration using reference pressure and temperature). In this particular embodiment the sensor (including memory, MCU, clock, and other circuits) is applied to a surface with adhesive, preferably similar to one that will be used during installation, the strain of pre-determined value is applied in relation to the strain sensing axes, temperature is taken into account and the MCU and memory are provided with calibration coefficients reflecting strain-to-output relations for linear and non-linear behavior under the range of anticipated temperatures.

Next preferred embodiment deals with low power strain signal processing where at least one strain gauge (semiconductor, metal resistive, MEMS electro-contact, capacitive or any other type) is in contact with surface of the material being tested and is in series with another passive component together comprising an R-C circuit where said circuit is excited by series of square pulses at pre-determined frequency (constituting sampling rate) and another point of this circuit is either grounded or connected to a reference voltage wherein the middle point of said circuit is connected to a voltage comparator with a pre-set threshold and the time between the front portion of said square pulse and the threshold point is measured using a timer. Yet another preferred embodiment includes a circuit where the timer is part of the MCU functionality (except for an optional external and more precise frequency oscillator used for providing an increased accuracy of said timer). The preferred configuration includes three active strain channels providing information for calculation of principal strains (or stresses) and angles between ASHM axis and an axis of principal strain.

For compensation of apparent strain and temperature related variation of the strain gauge output the MCU is used with said calibration coefficients or, in another preferred embodiment, a separate passive strain gauge is applied to the material matching the material being tested (in terms of closeness of thermal expansion coefficient) and the resulting output (for instance, counts provided by said timer, voltage, frequency, etc.) is used to offset the readings of the active strain measuring channels and compensate for signals arising from temperature effects. It is still a preferred solution to use a single strain gauge per each strain sensing channel and provide thermal compensation for said gauge using MCU contrary to Whetstone bridge configuration customary for conventional strain sensor circuits.

Yet another preferred solution is providing a self-contained circuitry, package and strain sensing means having a power input and a digital or analogue output/s for at least one strain sensing axis wherein said package has at least one side with elastic properties and is permanently or removably attached to a structure it is facing and therefore comprising a self-contained strain sensing integrated circuit (an IC chip).

Any of the leading and falling edges of the square pulses can be used for triggering said timers. After the leading edge the capacitor is being charged without any need for a switching circuit and the charge curve initiates triggering point at the pre-set threshold. Similarly, after the falling edge the capacitor is discharged and the discharge curve initiates triggering point at the pre-set threshold. The thresholds can be adjusted to provide for equal times of charge and discharge or, alternatively, if only a half of the sampling rate is acceptable the charge and discharge times can be combined in one reading by summing them up.

Therefore, it is another preferred embodiment where said serial capacitance-resistance (R-C) circuit has at least one active component with its value repeatedly correlating to strain value.

In another preferred embodiment the ASHM has an algorithm responsible for detection of a situation where a significant event is happening or is about to happen and it turns ON the ASHM data logging or data processing which helps to save power and extend battery life. Such event can be a flight of a fixed wing or rotary aircraft or a drone; trip of a vehicle or marine vessel; operation of a crane; filling in a vessel with liquid, solid or gas; loading of a structure by snow, wind, etc.

For detecting such upcoming event and the end of such an event a combination of different inputs is taken into account and the MCU provides positive identification of such event based on the algorithm of the detection.

In one instance where the detection of flight of a fixed wing aircraft is desired the 3-axial MEMS (or, if acceleration of gravity measurement is not desired, an appropriate filtering algorithm or a Piezo-electric accelerometer can be used) accelerometer outputs are first combined into a global vector of acceleration $AG=(A_x^2+A_y^2+A_z^2)^{0.5}$. The values of this vector AG in case of using MEMS accelerometer and when the ASHM is not moving are equal to acceleration of gravity G (for instance $G=9.82$ m/s$^2$, or other value depending on the altitude and longitude). The values $A_G$ are sampled at frequencies between 1 Hz and 5000 Hz wherein the higher is the probability of a high variation of the expected acceleration the higher value of the sampling rate should be. For instance, for a fixed wing aircraft flight recognition the sampling rate can be 100 Hz, for a projectile the sampling rate can be 5000 Hz, for a marine vessel −1 Hz.

The values of $A_G$ are processed for filtering wherein, as a simplified example only, say 1000 previous samples are averaged (time period of 10 seconds preceding current time) and the output is used as a reference value $A'_G$. Then, the deviation of actual value of $A_G$ from $A'_G$ is calculated:

$\Delta A=A_G-A'_s$. Based on these values and after integration, the velocity V can be determined and after second integration the distance S.

Another preferred embodiment includes determination of AG vector which is primarily aligned with axis parallel to the gravitational force and further determination of a plane orthogonal to said direction and mainly tangential to the horizontal surface and determining of either a particular vector of acceleration in said horizontal plane or a composite vector and determining of acceleration, velocity or distance in horizontal plane. Similarly, this approach can be used to determine acceleration in any other desired plane using gravitational force axis as a reference axis.

Therefore another preferred embodiment includes the method of detecting of an operational condition where at least one of the ASHM sensing means is used to wake up the ASHM and begin data logging/processing (acceleration, strain, pressure, temperature, humidity or a combination thereof), then a parameter related to the beginning of said operational condition is determined (for instance exceedance of strain, acceleration, velocity, distance, pressure, etc. of a pre-set threshold) and, alternatively, an additional factor supporting positive identification of the operational condition is determined (for instance reduction or gradient of atmospheric pressure after takeoff) and used to confirm the operational condition. In this instance, if the additional factor is not present, the data already recorded/processed can be erased or overwritten to free the memory available.

Yet another embodiment has an algorithm for detection of the end of operational condition, for instance absence of threshold crossing for any of the sensing means outputs or their combinations for a certain period or time or any desirable configuration of the sensing mean outputs or combination values not unlike using methods for detection of the beginning of said operational condition.

Examples include but not limited to the following predefined algorithms:
  Flight detection for a fixed wing aircraft (variants: a commercial aircraft, a military jet, etc.);
  Flight detection for a rotary or vertical takeoff aircraft;
  Flight detection for a drone;
  Launch detection for a reusable spacecraft;
  Trip detection for a ground vehicle;
  Trip detection for a marine vessel;
  Approaching load detection for a bridge;
  Pressure vessel or pipe loading condition detection, and
  Overloading condition detection based on pre-set thresholds of strains, pressure, acceleration or a combination thereof, etc.

Another preferred embodiment deals with providing an energy harvesting device capable of supporting at least a portion of power needed for ASHM operation. In one variant the solution includes Piezo-electric elements applied within the housing of the ASHM and facing the surface being under strain. Yet another preferred variant of this solution is using round shape ceramic Piezo-electric plates glued to the same surface of the ASHM housing as strain gauges. The round shape provides for improved fatigue life of the ceramic elements and equal sensitivity to a strain in any direction. The AC voltage output of said element/s can be converted in DC voltage by rectifying circuitry or any available IC specifically capable of converting AC voltage into DC voltage.

As the variation of strain happens only during operational conditions and the ASHM requires power for its sleep mode yet another preferred embodiment is providing for a combination of a Piezo-electric energy harvesting device with a thermal gradient energy harvesting device. The preferred embodiment includes several Peltier type generator plates (TEG) which envelope a mass of a material (core) with high heat capacity. Due to variation of outside temperature vs. temperature of said mass the energy of heat gradient is converted into electric energy without a need for a heat source and without any losses due to the fact that all heat flux is passing through Peltier elements.

The next preferred embodiment therefore includes a Piezo-electric energy generation means and Thermo-electric power generation means supplementing the harvested energy to the power supply of the ASHM and wherein said Thermo-Electric energy generating means are composed of at least several Peltier plates enclosing or enveloping a mass of a material with high heat capacity (water, paraffine, metals such as Aluminum, Beryllium or alike).

Yet another preferred embodiment deals with said mass also including integrated electronic circuitry such as ceramic, electrolytic or super capacitors, a battery, energy harvesting electronic management device, etc. with an objective of utilizing electronic components' own heat capacity to reduce the overall weight and size of said energy harvesting solution.

In one of the preferred embodiments dealing with Thermo-electric energy harvesting device a cube or prismatic body of a high heat capacity material or mass (core) is used in thermal link with six Peltier elements surrounding it and having a heat exchanger means attached to their outer surfaces for heat transfer to the ambient environment or any structural element. Yet another preferred embodiment includes said cube or prismatic element and Peltier elements associated with ASHM housing or battery or wireless module.

Another preferred embodiment provides for a method of detecting of a velocity and a displacement at the point of installation of the ASHM and comprising an accelerometer with at least one active axis of measurement providing an output and processing said output for determination of a base acceleration when the ASHM is not moving, subtracting said base line acceleration value from the value of measured acceleration at specific sampling rate and integration of the resulting acceleration for determination of velocity of said point and further integration of the velocity for determination of a displacement of said point. Further, said method provides for a calculated value based on individual axes acceleration measurement to provide an output proportional to velocity or displacement of said point relative to any given axis or a global vector of gravitational force or a combination thereof. In addition, such method includes all signals' processing and, if desired, data retention by an MCU being part of the same package the accelerometer is housed within.

Another preferred embodiment includes a signal processing means and an algorithm capable of frequency spectral analysis wherein the input signal can come from an accelerometer or strain gauges (including electrical signals proportional to strain or acoustic wave received from the Piezo-Electric plate mentioned hereabove), or both. Yet another method includes processing of strain or acceleration (as well as calculated values based on: principal strains, stresses, velocity, displacement, etc.) for spectral analysis or frequency or amplitude or both and generation of a snapshot/s of frequency response of the structure the ASHM is attached to. Further, this preferred method provides for comparison of said snapshots with normal conditions defined under certain operational conditions, detection of discrepancies and generating an alarm or a time-stamped event and storing it in ASHM memory.

Next preferred embodiment features combination of data processing capabilities (i.e. for Rain-Flow tables, velocity, displacement, corrosion factor, etc.) and logging of any of the primary outputs of the plurality of sensing means or calculated values based on those continuously or at certain intervals of time and/or if any of the above values crosses a pre-set threshold or meets some pre-defined criteria based on logic operations dealing with a decision-making based on multiple inputs.

Another preferred embodiment explains a concept of a self-contained, miniature and autonomous smart sensor having a plurality of sensing means which comprise a sufficient amount of inputs for establishing sufficient information and assessment of structural health. More particularly—dealing with loading history, assessment of damage factors and providing vital information related to further maintenance of the structure based on combination of the history comprising information from multiple inputs and processed events.

Yet another preferred embodiment includes an ASHM with strain sensing means and an algorithm for applying a correction factor to offset a variation of the measured strain due to creep in adhesive, materials of the stain gauges or material of the structure under testing under prolonged static or asymmetrical dynamic strains. Said algorithm includes processing the signal from at least one strain channel and temperature sensor for effects of history of loading and taking into account viscoelastic properties of adhesive layer/s, elastic layers of the housing (if in-between the strain sensor and surface of material) and temperature. In one variant of such algorithm the derivatives of strain signals are obtained for a pre-determined time intervals and time estimated from the middle of said interval to present time, a fraction of contribution to a total creep from said derivative occurred in the past with given temperature is determined and a sum of all derivative and temperature driven creeps is calculated and the present strain value corrected by subtracting or adding said sum. Yet another preferred method includes unequal time intervals as per the method above wherein more recent time intervals are shorter than the more historical intervals. Yet another preferred method includes time intervals used for assessment of effects of derivative strains and temperatures on creep where the most resent time interval is equal to is or any other fixed value and the next intervals extending into the past history are, accordingly, proportional to multipliers: $2^1$, $2^2$, $2^3$, $2^4$, $2^5$ . . . $2^{25}$=33554432 s or more covering past period of 1 year, for example. As the intervals change, the derivatives of strains and values of temperatures are averaged over these intervals allowing to reduce the amount of information processed and stored without affecting the precision of creep compensation values.

The present invention provides systems for the measurement and logging of strain and other parameters history in a wide variety of applications and can work as a standalone or integrated sensor or recording device for use in variety of applications where the measured parameter can be used in assessment of the structural health and prediction of maintenance intervals and harmonizing its schedule.

Advantageous Effects of Invention

The invention provides a cost effective, autonomous and ultra-low power consumption strain and all other parameters affecting structural health history monitoring system capable of recording, processing and storing compressed data on the entire history of meaningful events over many years of operation. Its small size and simplicity of installation makes it possible to use the invention in variety of applications and industries helping to achieve better assessment of structural integrity, predicting or estimating fatigue life of a structure and harmonizing maintenance intervals, repair and overhaul processes thus reducing its costs and allowing for improved safety of a structure.

BRIEF DESCRIPTION OF DRAWINGS

The invention is better described with reference to the drawings in which:

FIG. 7a)—rectangular footprint, FIG. 7 b)—square footprint, FIG. 7 c)—octagonal footprint, FIG. 7 d)—circular footprint, and FIG. 7 e)—hexagonal footprint;

FIG. 19 illustrates the configuration of the strain sensing means per a preferred embodiment of present invention where three piezo-resistive semiconductor or metallic type strain gauges are employed in a rosette configuration;

FIG. 20 further illustrates another variant of the rosette of three strain gauges with simplified configuration and elimination of the need for two wires, which will be described herein below in conjunction with the preferred circuitry for excitation of the strain gauges and reduction of power consumption;

FIG. 21 further represents an elevation of the ASHM where strain sensing means are part of the flexible (deformable) substrate simultaneously acting as an additional printed circuit board for providing contact pads or spring-loaded pins in order to simplify the ASHM assembly. In addition, said printed circuit board can house additional electronic circuitry, preferable used for conditioning of the signal form strain sensing means and before the output can be received by the main board. This deformable substrate-PCB can also house energy harvesting means, for instance PiezoElectric plates sensitive to the strain in said deformable substrate passed from the structure (not shown);

FIGS. 22a) through d) illustrate methods and means for providing a secure attachment between the ASHM bottom surface and the surface of the structure and helping to eliminate delamination of the adhesive under high stresses typically initiated between a side wall of the housing and the adhesive (FIG. 22 a)) in a form of a crack that can propagate under the surface of the ASHM;

FIG. 25 illustrates the prior art and most widely used circuit including a Wheatstone bridge for measuring of strains from resistive strain gauges. The disadvantage remains a high-power consumption which can run up to 100 mA per one strain channel and is prohibitive for autonomous operation;

FIG. 26 further illustrates another variant of prior art employing capacitance discharge circuit driven by charge-discharge circuit switched using MOSFET devices. This technology is commercialized by PicoStrain (PMT Precision Measurements Technology, USA, Germany). The disadvantage of this technology is high power consumption due to necessity of using MOSFET switches for providing charge and discharge cycles (8 mA at 1000 Hz sampling rate);

FIGS. 27$a$), 27$b$) and 27$c$) illustrate the serial R-C circuit with resistive strain sensing mean connected to a ground or a reference voltage source. Particularly, FIG. 27 $a$) illustrates the schematic, FIG. 27 $b$) illustrates the shape of the output of R-C circuit crossing a certain threshold Vr on charge and discharge cycle of the capacitor C and FIG. 27 $c$) illustrates the same charge-discharge curve crossing two thresholds. The RC circuit is driven by a pulsed excitation voltage repeating at pre-determined sampling rate (ranging from 1 to 2000 Hz as typical example);

FIGS. 28$a$) and 28$b$) further illustrate another variant of the R-C circuit with capacitor C connected to a ground or a reference voltage (FIG. 28 $a$)) and FIG. 28 $b$) illustrates the output of the circuit where charge-discharge signal has positive and negative polarity and $t_e$ indicates the width of the square excitation pulse +V. The operational amplifier can also serve as a comparator for both circuits presented in FIG. 27 and FIG. 28 and produce a square shape logic signal with width representing time between any edge of the excitation signal +V and time of signal crossing threshold/s;

FIGS. 29$a$), 29$b$) and 29$c$) illustrate the time diagram for one mode of the invention, particularly FIG. 29 $a$) illustrates the shape of the excitation signal, FIG. 29 $b$) charge-discharge curve as per circuit presented in FIG. 27 and FIG. 29 $c$)—clock frequency of a timer to measure any of the times between the rise or fall portion of the excitation signal and any of the thresholds. An MCU is further processing the counts Nc (on charge) and Nd (on discharge) and provides for mathematical operations, such as subtraction of the initial counts at zero strain (taring), summing up or averaging two counts (Nc and/or Nd) and producing digital output representing change of strain and taking into account gain factor of an individual strain gauge, temperature and such parameters as creep, transfer function accounting for deformability of any layer between the structure and strain gauge and others;

FIG. 30 further illustrates typical relation between said counts and resistance of the strain gauge, mainly proportional to the measured strain (in this particular instance—positive strains related to tensile loading), where Ro represents the resistance of the strain gauge at zero strain. It is important to mention that in conjunction with FIGS. 27-30 either resistive change can be measure or capacitance change in case of the strain sensitive mean being a capacitance based (MEMS capacitance or electro-contact displacement sensor, for instance);

FIG. 31 illustrates the configuration of the accelerometer in a position defined by a particular ASHM mounting where orientation of the axes (x, y, z) is not known;

FIG. 32 further illustrates a method where a MEMS accelerometer sensitive to gravitational force is served as a means for determining of the direction of gravity through calculation of a global acceleration $\alpha_{xyz}=(\alpha_x^2+\alpha_y^2+\alpha_z^2)^{0.5}=g$;

FIGS. 33$a$), 33$b$) and 33$c$) further illustrates a methodology for determining of a condition positively indicating that a flight has begun. Particularly, FIG. 33 $a$) describes raw signals received from the accelerometer's axes x, y and z. FIG. 33 $b$) presents a function of the global acceleration $\alpha_{xyz}$ signal per FIG. 33 $a$) and FIG. 33 $c$) presents the same signal with baseline acceleration (mainly responsible for gravitational force) subtracted from it. Yet, the FIG. 33 $d$) is a representation of the integral of the signal per FIG. 33 $c$) fairly close representing the velocity V of the aircraft. The threshold point "A" represents a condition which reflects the minimum velocity at which an aircraft can take off. This velocity threshold setting can be different for different types of aircrafts. Finally, FIG. 33 $e$) is a representation of change in barometric pressure of the atmosphere converted into altitude readings (using standard relationship between the altitude, barometric pressure and temperature on the ground), which, at the moment of reaching threshold "B" confirms that the airplane is gaining altitude and is actually in flight.

FIG. 37 illustrates an example of ASHM applied to a cantilever beam for detection of the displacement at point of application of the ASHM;

FIGS. 38$a$) and 38$b$) further illustrate the variation of the displacement along the beam length in Z direction when a displacement $\Delta$ is applied to the free end of the beam;

FIGS. 39$a$) and 39$b$) illustrate a method where acceleration of gravity $\alpha_g$ is first subtracted from the acceleration $A_z$ and then two consecutive integration steps are provided to determine velocity $V_z$ and displacement $\Delta_z$ at the point of application of the ASHM aligned with its acceleration sensing means;

FIG. 40 illustrates a composition of the individual fatigue tables containing counts obtained per Rain-Flow algorithm or alike (per flight or trip, for instance) and a global fatigue table being a sum of said individual tables;

FIG. 41 further illustrates typical processing algorithm for determination of ranges and mean values between peaks and valleys of the processed strain signal;

FIG. 42 illustrates an example of true strain applied in a shape of a pulse where section defined by points a-b indicates loading, section b-c indicates constant strain, section c-d indicates unloading, and section d-e—zero strain;

FIG. 43 illustrates behavior of the strain (as read from the strain sensing means) where sections b-c and d-e are affected by creep occurring in layer/s connecting said strain sensing means and the surface of the structure;

FIG. 44 illustrates the amount of strain that needs to be applied on top of the signal received from strain sensing means in order to compensate for said creep;

FIG. 45 illustrates an example of signal from strain sensing means compensated for creep and used for further processing (reflecting true strain);

FIG. 46 shows typical pattern of relative change in strain measurements due to creep over time and under loading at different temperatures;

FIG. 47 illustrates the same pattern of change described in FIG. 46 but plotted using semi-log methodology;

FIGS. 48a), 48b) and 48c) presents an overall methodology for achieving creep compensation where historical values of measured strain and temperatures (FIG. 48 a)) provide for information necessary for determination of compensation value of strain aimed to offset the effects of the creep (FIG. 48 b)) and corrected strain values equal or close to the true strains the structure has historically experienced (FIG. 48 c));

FIG. 51 b) illustrates a cubical shape of such core surrounded by six square Peltier plates; and, FIG. 52 further illustrates that said core can have an electronic circuit and/or energy cumulating means (a rechargeable battery, super capacitor, bank of ceramic capacitors or other means having its own heat capacity properties as a material) and a filler providing for elimination of an empty space inside said core. The system further can have sealed corners and means to eliminate or diminish the thermal bridges between sides of the Peltier plates (by applying vacuum, for instance) as well as it can have heat exchange means associated with external or internal sides of said Peltier plates or said core for enhancing or reduction of thermal transfer between said core and ambient environment (not shown).

BEST MODE FOR CARRYING OUT THE INVENTION

Best Mode

Figure 2:
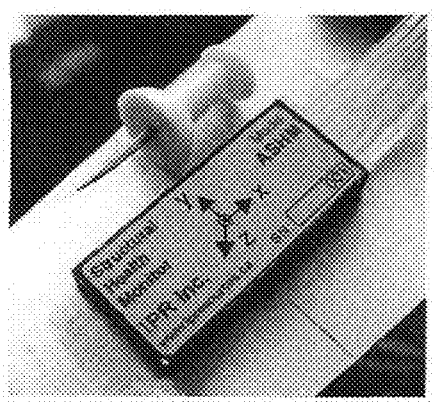
FIG. 2 illustrates an overall view of the preferred embodiment of the present invention representing a self-contained structural health monitor with data collection and processing capabilities based on multi-sensing approach.
Figure 15:
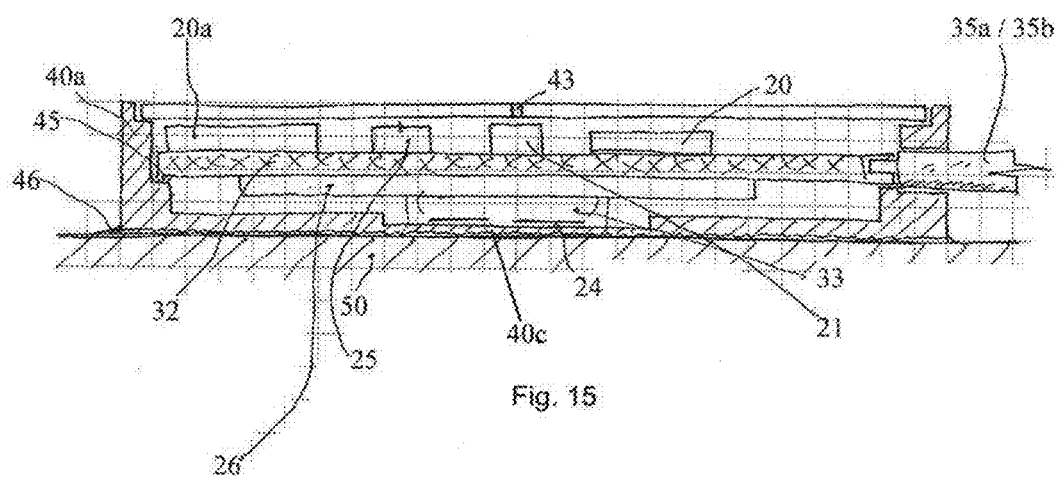
FIG. 15 illustrates a cross-sectional view of the ASHM at A-A shown in FIG. 7a, showing internal arrangement with printed circuit board with sensory means, MCU, memory and interface and strain sensing means attached to the deformable part of the housing glued to a surface.

Best mode of the invention is generally illustrated by FIGS. 2 and 15. A comparison of the best mode of the invention with a conventional one axis strain gauge (passive) is evident from FIGS. 2 and 3.

MODE FOR THE INVENTION

Mode for Invention

Figure 3:
FIG. 3 illustrates the conventional single axis strain gauge shown in comparison with the preferred embodiment as per FIG. 2.

FIG. 2 shows an exemplary packaging embodiment of an autonomous structural health monitor (ASHM) of the present invention. FIG. 3, on the other hand, shows a prior art packaging of one-axis strain sensor by Columbia Labs.

In at least one embodiment of the present invention, it relates to a system for monitoring, logging and processing of events related to mechanical stress conditions and environmental conditions universal for each structure.

As will be a readily appreciated by the skilled person, all components discussed herein can be manufactured of any suitable material and by any suitable manufacturing method including those customary to micro-machining and MEMS technological processes as will be readily understood by the skilled person.

In at least one embodiment of the present invention, it provides portable sensing means and a device for continuous monitoring, logging and processing of stress conditions, vibration or displacement conditions, pressure and environmental conditional like humidity and temperature in a physical structure, while achieving low power consumption and adequate memory storage allowing for monitoring over an extended period.

Figure 4:
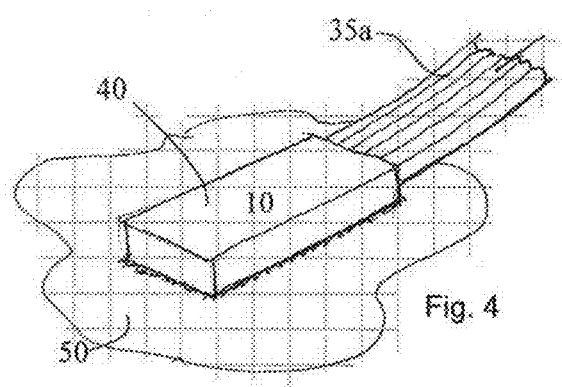
FIG. 4 illustrates the preferred embodiment per present invention with housing and a cable for interface and connection to a power supply.
Figure 5:
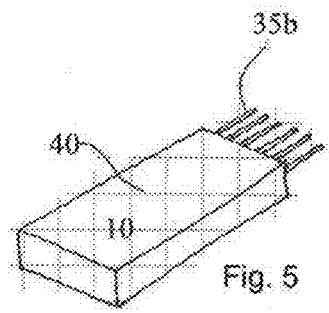
FIG. 5 illustrates the preferred embodiment per present invention with housing and a connector for interface and connection to a power supply.
Figure 6:
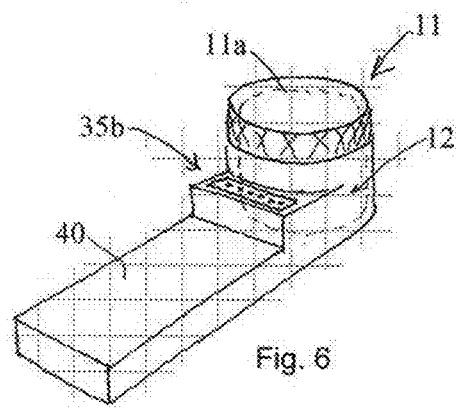
FIG. 6 illustrates the preferred embodiment per present invention with housing, connector for interface and an integral or modular power supply attached to the housing.

Various exemplary forms of the present invention are shown in FIGS. 4, 5 and 6. The housing 40 of the ASHM 10 would be installed on a surface of the material 50 for monitoring. The housing 40 may include cables 35a or connector 35b for communicating with or/and powering ASHM 10. Another exemplary form of the present invention, the housing 40 has a connector 35b an battery compartment 11 for holding a battery 12 therein. The battery 12 may be accessible via a cover 11a.

Figure 7:
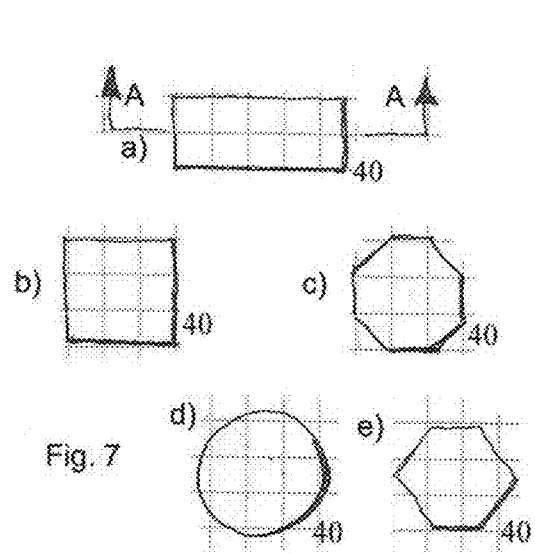
FIGS. 7a) to 7e) illustrate different configurations of the footprint of the housing, i.e.

While foot print of the housing 40 is shown as rectangular shape, various other shapes can be used. For example, FIG. 7 a) shows a rectangular footprint; FIG. 7 b) shows a square footprint; FIG. 7 c) shows an octagonal footprint; FIG. 7 d) shows a circular footprint; and FIG. 7 e) shows a hexagonal footprint. As it can be seen, ASHM 10 may take any one of these footprints or any other types of the footprints, depending on constraints or requirements.

FIGS. 22a) through 22d) illustrate various methods and means for providing a secure attachment between the bottom surface of the housing 40 of the ASHM 10 and the surface of the structure 50 using adhesive 47 and helping to eliminate delamination of the adhesive 47 under high stresses typically initiated between a bottom portion 44a of the side wall of the housing 40 and the adhesive 47 as shown in FIG. 22a) in a form of a crack that can propagate under the surface of the ASHM 10. As it can be seen, various shapes or means, including wedge-like shape 44b, multi-wedge-shape 44c, flap 44d and flexible substrate 42 which is extended outside the perimeter of the housing 40 were tested in order to provide more stability of adhesive 47 itself and adhesion with the surface 50. It is found that each of the shapes 44b, 44c, 44d and 42 is better than that of the bottom portion 44a.

Figure 14:
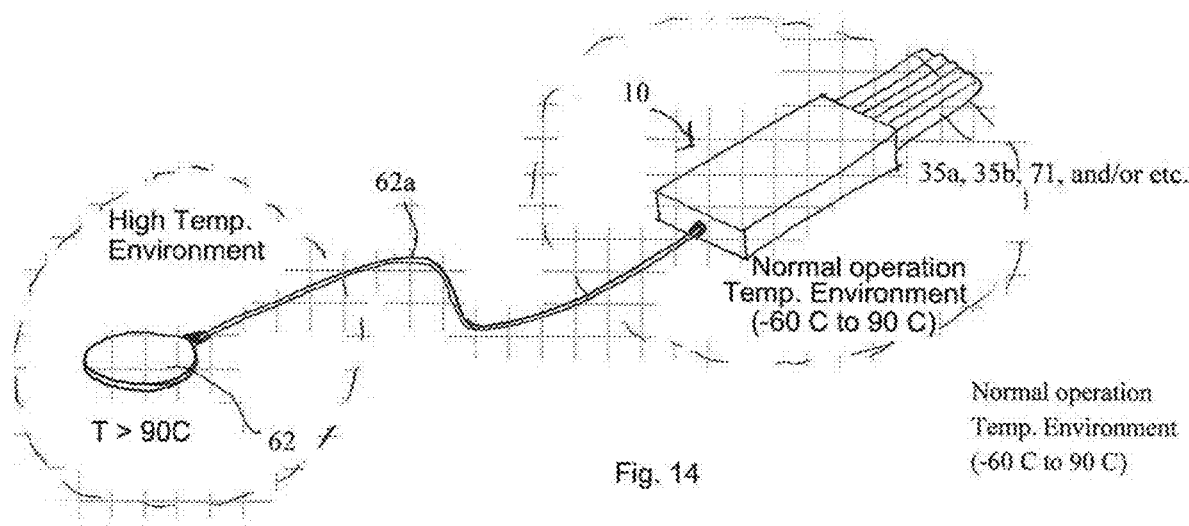
FIG. 14 illustrates an arrangement where an external strain sensing means are used in conjunction with ASHM for reaching confined spots of the structure or providing for a high temperature measurement where the ASHM operational temperature (typically −60 C to +85 C) does not allow direct applications of the ASHM (turbojet engines parts, for instance)

FIG. 14 illustrates another arrangement where an external strain sensing means 62 are used in conjunction with ASHM 10 for reaching confined spots of the structure or providing for a high temperature measurement where the ASHM operational temperature (typically −60° C. to +85° C.) does not allow direct applications of the ASHM 10 (turbojet engines parts, for instance). The external strain sensing means 62 may be operational in a high temperature environment, such as the temperature thereof may be above 90° C. The external strain sensing means 62 is connected with ASHM 10 via a high temperature cable 62a (of a variable length) to withstand an extreme high temperature condition(s). ASHM 10 may further be connected with cable 35a, connector 35b, wireless communication means 71 for various other purposes.

According to a preferred embodiment of the present invention, it provides an autonomous structural health monitor (or ASHM) 10 contained in a miniature housing 40 (typically of 4 grams or less of weight, having a footprint of less than 3.5 cm$^2$ and providing for maximum power consumption of no more than 6.5 mW or 1.8 mA @ 3.6 VDC), which has at least one side (bottom, for instance) with elastic properties that can be glued to a surface of a structure 50, at least one strain sensor 24 or strain sensing channel, an environmental sensor 25, which may include, but not limited to a temperature sensor 25a having a thermally conductive connection to the strain sensor 24, relative humidity sensor 25b, 3-axial accelerometer 21 and barometric pressure sensor 25c, all incorporated into said housing 40 and hermetically sealed except for the input channel of the relative humidity 25b and pressure 25c sensors. The sensor can have an internal or external power source, power management circuit 29 providing for a stable supply to the strain sensor/s excitation circuits, non-volatile memory 20a (preferably of F-RAM type), microcontroller unit (MCU) 20 with clock frequency of at least 1.0 MHz, real time clock oscillator 27 for precise time stamps and a variety of interfaces (serial, parallel, wireless or near field magnetic, RF, optical or surface acoustic wave).

FIG. 15 further illustrates a cross-sectional view of ASHM 10 at A-A shown in FIG. 7a, showing internal arrangement with printed circuit board 32 with analog electronics and signal conditioning 26, sensory means including, but not limited to, environmental sensor 25 (containing one or more of: temperature sensor, relative humidity sensor, ambient pressure sensor, gas analyzer, etc.), MCU 20, memory (preferably non-volatile memory, and further preferably F-RAM) 20a, interface cable/connector 35a/35b and strain sensing means 24 attached to the deformable part 40c of the housing 40 permanently or removably attached to a surface 50. For measuring a temperature on the surface 50, a heat conductor 33 may be used for conducting heat to a temperature sensor 25a. ASHM 10 further comprises an accelerometer (3-axis accelerometer) 21. The housing 40 may define an opening or hole 43 for allowing the ambient pressure sensor within the environment sensor 25 to measure the ambient pressure.

FIG. 21 shows another cross-sectional view of ASHM 10 where strain sensing means 24 are part of the flexible (deformable) substrate 42 simultaneously acting as an additional printed circuit board for providing contact pads 37 or spring-loaded pins 36 in order to simplify the ASHM assembly. In addition, the printed circuit board on the flexible substrate 42 can house additional electronic circuitry, preferable used for conditioning of the signal form strain sensing means 24 and before the output can be received by the main printed circuit board 32. This deformable substrate-PCB 42 can also house energy harvesting means 75 (now shown in FIG. 21), for instance PiezoElectric plates 25d sensitive to the strain in said deformable substrate 42 passed from the structure 50 (shown as a surface). In this case, the housing 40 may be a rigid housing 40b. Structural adhesive 47 may be used to attach the rigid housing 40b to the flexible substrate 42.

Prior to putting ASHM 10 into an operation, it would be desirable to calibrate strain sensor 24. For calibration, ASHM 10 would be detachably mounted on a surface of a calibration member. The calibration member has known strain and temperature condition. At, at least, two different temperatures, which may be representative of operational temperature range of ASHM 10, at least two measurements at different strain conditions are taken. Raw or uncompensated measurements from the strain sensor 24 are, then, processed for providing necessary correlation factor/coefficient factors for compensating temperature related errors. ASHM 10 is, then, programmed with these compensation factors/coefficients for producing strain values for expected strain range and temperature range operational conditions.

Figures 16, 17, 18:
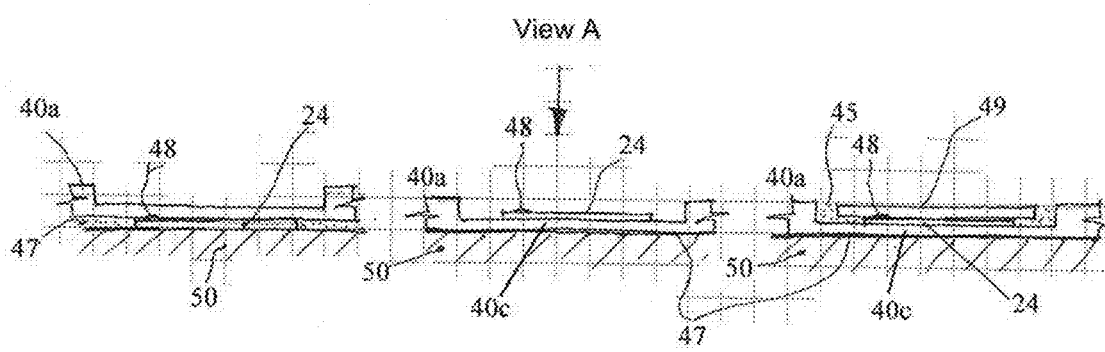
FIG. 16 illustrates an instance where strain sensing means (gauges) are positioned on the bottom side of the housing and directly facing a structure. This arrangement provides for reduced creep and higher gain of the strain sensing means due to elimination of the intermediate visco-elastic layer of the housing.
FIG. 17 illustrates a preferred embodiment of the present invention where strain sensing means are attached to the inner surface of the deformable part of the housing and provide for easy and secure arrangement simplifying handling of the ASHM and providing for a practical solution where elevated temperatures and related creep are not an issue (dynamic loading characteristic for the most aircraft structures)
FIG. 18 further illustrates a configuration where strain sensing means are "sandwiched" between deformable part of the housing and an additional substrate having elastic properties comparable to the elastic properties of the housing and provides for reduction of shear stresses in adhesive by re-distributing it over both surfaces of the strain sensing means and therefore reducing the creep and increasing the gain.

FIGS. 16 to 18 shows various options for fastening or attaching the strain sensing means 24 on the surface 50 for measuring the strain thereof.

FIG. 16 illustrates an instance where strain sensing means (gauges) 24 are positioned on the bottom side of the housing 40 (or flexible housing 40a) and directly attaching on and facing to a surface of the structure 50. This arrangement provides for reduced creep and higher gain of the strain sensing means 24 due to elimination of the intermediate visco-elastic layer of the housing 40/40a. Structural adhesive 47 may be used to attach the housing 40/40a on the surface of the material 50. Wiring 48 may be routed between the strain sensing means (gauges) 24 and the housing 40 (or flexible housing 40a).

FIG. 17 illustrates a second instance where strain sensing means 24 are attached to the inner surface of the deformable part 40c of the housing 40/40a and provide for easy and secure arrangement simplifying handling of the ASHM 10 and providing for a practical solution where elevated temperatures and related creep are not an issue (dynamic loading characteristic for the most aircraft structures). The housing 40/40a can be attached to the surface of the material 50 using a structural adhesive 47, for instance.

FIG. 18 further illustrates yet another configuration where the housing 40/40a is attached to the surface of the material 50 using a structural adhesive 47, strain sensing means 24 are "sandwiched" between deformable part 40c of the housing 40/40a and an additional substrate 49 having elastic properties comparable to the elastic properties of the housing 40/40a or deformable part 40c and provides for reduction of shear stresses in adhesive by re-distributing it over both surfaces of the strain sensing means 24 and therefore reducing the creep and increasing the gain.

Another embodiment of the present invention can provide an extremely low power consumption digital strain sensor capable of easy implementation into a variety of applications.

Figure 23:
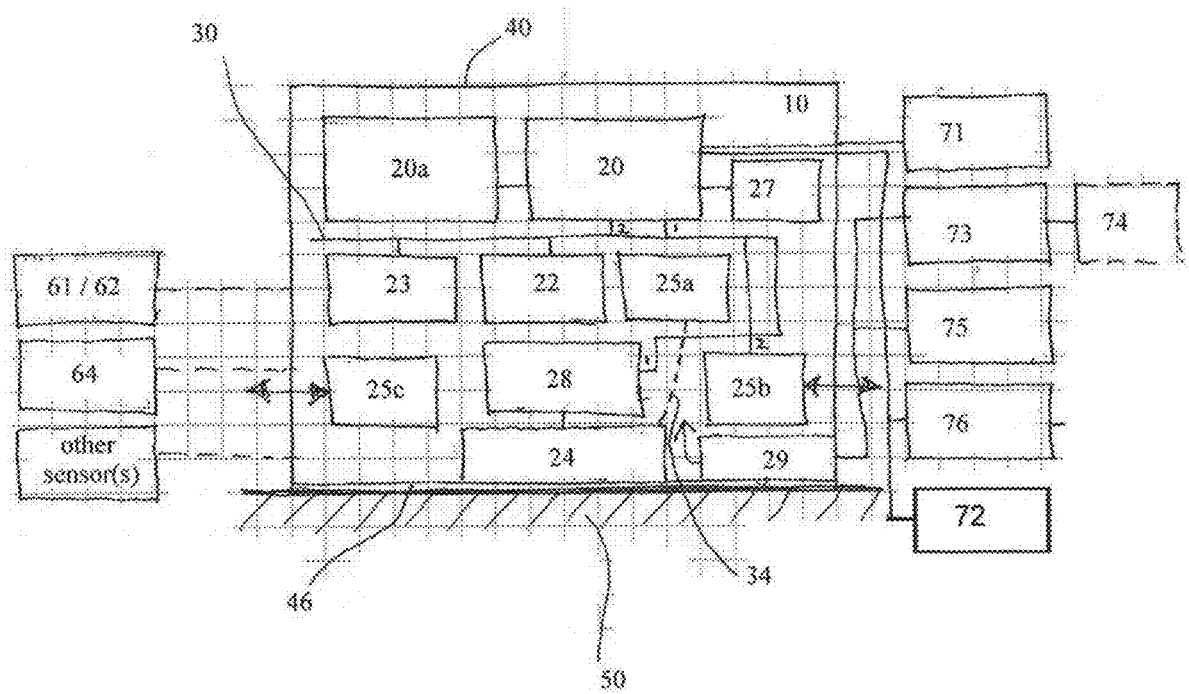
FIG. 23 illustrates the block-diagram of the preferred embodiment explaining main functional elements of the ASHM and their configuration. The dotted line shows heat bridge assisting in achieving temperature readings as close as possible to the actual temperature of the strain sensing means (which output is most affected by the temperature), both in terms of gain factor and in terms of apparent strains (function of thermal expansion coefficient of the material of structure and any intermediate layer between structure and strain sensing means)

FIG. 23 illustrates the block-diagram of the preferred embodiment explaining main functional elements of ASHM 10 and their configuration. ASHM 10 comprises, within housing 40, MCU 20 and a non-volatile memory 20a. Clock generator 27 provides clock to the MCU 20 for computational operations. MCU 20 is, over a bus or I2C, etc. serial interface 30, in communication with accelerometer 23, gyroscope 22, temperature sensor 25a, humidity sensor 25b, pressure sensor/barometric pressure sensor 25c, strain-to-digital/time sensor 28 which is in communication with strain sensing means 24. The dotted line between the strain sensing means 24 and temperature sensor 25a is a heat bridge (or means for heat transfer) 34 assisting in achieving temperature readings as close as possible to the actual temperature of the strain sensing means 24 (output of the strain sensing means would most likely be affected by the temperature), both in terms of gain factor and in terms of apparent strains (function of thermal expansion coefficient of the material of structure 50 and any intermediate layer between structure 50 and strain sensing means 24). ASHM 10 may be arranged to connect with external sensing means, including, but not limited to, high temperature sensor 61, high temperature strain sensor 62, remote strain sensor 63, corrosion sensor 64, and/or other sensors. ASHM 10 may further be connected to external peripherals or support means, including, but not limited to wireless interface 71, RF/acoustic/optical interface 72, battery 73/battery extension(s) 74, energy harvesting module 75, and/or wired interface (serial/parallel) 76, etc.

Various sensors may be used for determination of predefined conditions. For instance, barometric pressure sensor 25c can indicate change in altitude of a plane, in combination with data form accelerometer 23, ASHM 10 can assist in positive identification of a flight condition of an aircraft, for example. The multiple data inputs can serve as inputs for processing information at MCU 20 using neural network approach and increasing sensor accuracy, reduction of power consumption and assessing the integrity or fatigue state of the structure.

Figure 24:
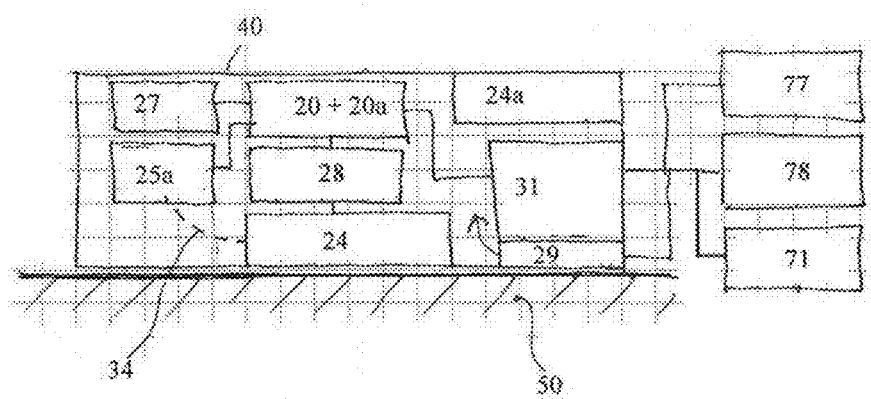
FIG. 24 further illustrates another variant of the ASHM configured as an integrated digital strain gauge.

FIG. 24 further illustrates another variant of ASHM 10 configured as an integrated digital strain gauge 24a. Integrated digital strain gauge 24a comprises, in a housing 40: MCU 20 and non-volatile memory 20a. MCU 20 is in communication with strain to digital/time sensor 28, which is connected to strain sensing means 24. MCU 20 is further in communication with temperature sensor 25a for measuring temperature at strain sensing means 24 via a heat transfer bridge 34. MCU 20 is yet further in communication with a serial/parallel interface 31 for providing parallel interface 77, USB interface 78, and/or wireless interface 71. Power management module 29 may be provided for managing the power provided to and consumed in the integrated digital strain gauge 24a.

FIG. 25 illustrates the prior art and most widely used circuit including a Wheatstone bridge for measuring of strains from resistive strain gauges 90 by applying excitation voltage. The disadvantage remains a high-power consumption which can run up to 100 mA per one strain channel and is prohibitive for autonomous operation. For instance, a conventional thermally compensated circuit would preferably require four strain gauges per one channel. With typical strain gauge resistance of 300 Ohms and excitation voltage 10 VDC, the current consumption of the gauge circuit itself will be 33 mA. To obtain a full picture of strain distribution on a planar surface at least three strain directions must be assessed, that bring the overall current consumption of the gauges to 100 mA and power consumption to 1 W. Apart from A/D converter, signal conditioner and other electronic circuits if such a solution is deployed it will require a battery or a power source of 87.6 kW*hour for functioning autonomously for 10 years. A battery of this capacity will weight over 20 kg. This makes the conventional technology prohibitive and costly.

FIG. 26 also illustrates another prior art strain measurement circuit, employing capacitance discharge circuit driven by charge-discharge circuit switched using MOSFET devices. This technology is commercialized by PicoStrain (PMT Precision Measurements Technology, USA, Germany). The disadvantage of this technology is also high power consumption due to necessity of using MOSFET switches for providing charge and discharge cycles (8 mA at 1000 Hz sampling rate).

FIGS. 27a), 27b) and 27c) illustrate the serial R-C circuit with resistive strain sensing mean connected to a ground or a reference voltage source. Particularly, FIG. 27a) illustrates the schematic thereof; FIG. 27b) illustrates the shape of the output of R-C circuit crossing a certain threshold Vr on charge and discharge cycle of the capacitor C; and FIG. 27c) illustrates the same charge-discharge curve crossing two thresholds. The R-C circuit is driven by a pulsed excitation voltage repeating at pre-determined sampling rate (ranging from 1 to 2000 Hz as typical example);

FIGS. 28a) and 28b) further illustrates a R-C circuit, a variant from ones shown in FIG. 27a), with capacitor C connected to a ground or a reference voltage (FIG. 28a) and FIG. 28b)) and illustrates the output of the circuit where charge-discharge signal has positive and negative polarity and $t_e$ indicates the width of the square excitation pulse +V. The operational amplifier can also serve as a comparator for both circuits presented in FIG. 27a) and FIG. 28a) and produces a square shape logic signal with width representing time between any edge of the excitation signal +V and time of the signal crossing threshold/s.

FIGS. 29a), 29b) and 29c) illustrate the time diagrams in accordance with the present invention, particularly FIG. 29a) illustrates the shape of the excitation signal; FIG. 29b) charge-discharge curve as per circuit presented in FIG. 27a); and FIG. 29c)—clock frequency of a timer to measure any of the times between the rise or fall portion of the excitation signal and any of the thresholds. MCU 20 is further processing the counts $N_c$ (on charge) and $N_d$ (on discharge) and provides for mathematical operations, such as subtraction of the initial counts at zero strain (taring), summing up or averaging two counts ($N_c$ and/or $N_d$) and producing digital output representing change of strain and taking into account gain factor of an individual strain gauge, temperature and such parameters as creep, transfer function accounting for deformability of any layer between the structure and strain gauge and others.

$$N_c = t_c \bullet f_c$$

$$N_d = t_d \bullet f_c$$

where, $t_c$ is time to charge to a charge threshold level; $t_d$ is time to discharge to a discharge threshold level; $f_c$ is clock frequency.

FIG. 30 illustrates typical relation between the counts ($N_c$, $N_d$) and resistance of the strain gauge, R, mainly proportional to the measured strain ε (in this instance—positive strains related to tensile loading), where $R_0$ represents the resistance of the strain gauge at zero strain. It is important to mention that in conjunction with FIGS. 27-30 either resistive change can be measure or capacitance change in case of the strain sensitive mean being a capacitance based (MEMS capacitance or an electrocontact displacement sensor per prior art by Okulov, for instance).

FIG. 31 illustrates the configuration of the accelerometer in a position defined by a particular ASHM 10 mounting where orientation of the axes (x, y, z) is not known.

FIG. 32 further illustrates a method where a MEMS accelerometer sensitive to gravitational force is served as a means for determining of the direction of gravity through calculation of a global acceleration $\alpha_{xyz} = (\alpha_x^2 + \alpha_y^2 + \alpha_z^2)^{0.5}$, where $\alpha_x$ is an acceleration along x-axis; $\alpha_y$ is an acceleration along y-axis; and a z is an acceleration along z-axis. When there is no movement, $\alpha_{xyz}=g$, where g is acceleration of gravity.

FIGS. 33a), 33b) and 33c) further illustrate a methodology for determining of a condition positively indicating that, in case ASHM 10 is installed on an aircraft, a flight thereof has begun. Particularly, FIG. 33a) describes raw signals received from the accelerometer's axes x ($\alpha_x$), y ($\alpha_y$) and z ($\alpha_z$); FIG. 33b) presents a function of the global acceleration $\alpha_{xyz}$ signal per FIG. 33a); and FIG. 33 c) presents the same signal with baseline acceleration (mainly responsible for gravitational force) subtracted from it ($\alpha_{xyz}-\overline{\alpha}_{xyz}$, where $\overline{\alpha}_{xyz}$ is acceleration at no movement, thus representing acceleration of gravity, g).

FIG. 33d) is a representation of the integral of the signal per FIG. 33c) fairly close representing the velocity V of the aircraft. The threshold point "A" represents a condition which reflects the minimum velocity at which an aircraft can take off. This velocity threshold setting can be different for different types of aircrafts. Finally, FIG. 33e) is a representation of change in barometric pressure of the atmosphere converted into altitude readings (using standard relationship between the altitude, barometric pressure and temperature on the ground), which, at the moment of reaching threshold "B" confirms that the aircraft is gaining altitude and is actually in flight.

Figure 34:
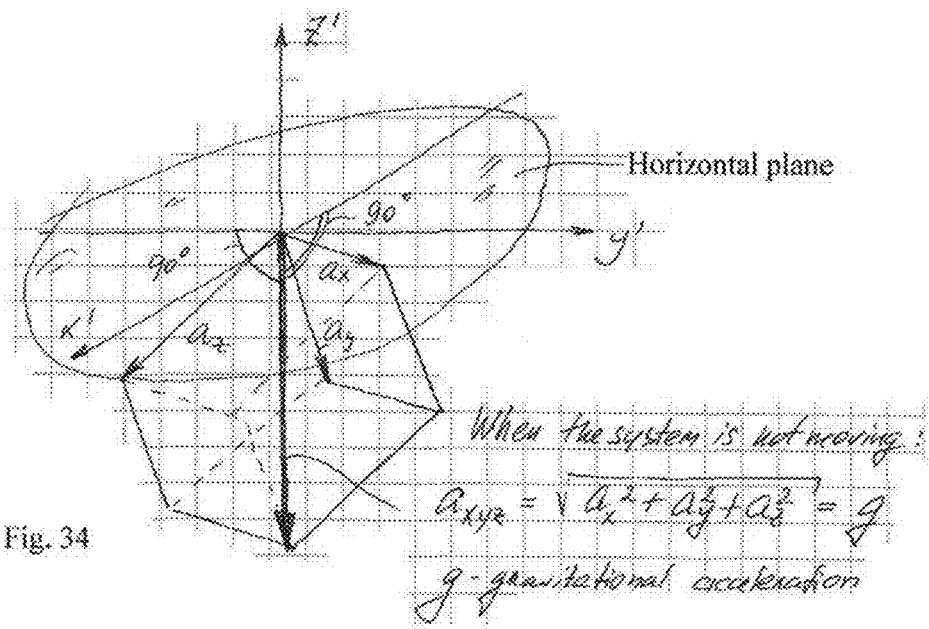
FIG. 34 illustrates the configuration of the accelerometer in a position defined by ASHM mounting where orientation of the axes (x, y, z) is not known and where the gravitational acceleration "g" helps determining the orientation of the surface orthogonal to "g" vector and defining the horizontal plane defined by axes x' and y'.

FIG. 34 illustrates the configuration of the accelerometer in a position defined by ASHM 10 where orientation of the axes (x, y, z) is not known and where the gravitational acceleration "g" helps determining the orientation of the surface orthogonal to "g" vector and defining the horizontal plane defined by axes x' and y'. This may be done as a part of process for calibrating ASHM 10. In particular, when ASHM 10 is not moving, $\alpha_{xyz}=(\alpha_x^2+\alpha_y^2+\alpha_z^2)^{0.5}=g$. Accordingly, based on reading of $\alpha_x$, $\alpha_y$, and $\alpha_z$, the orientation of ASHM 10 may be calculated.

Figure 35:
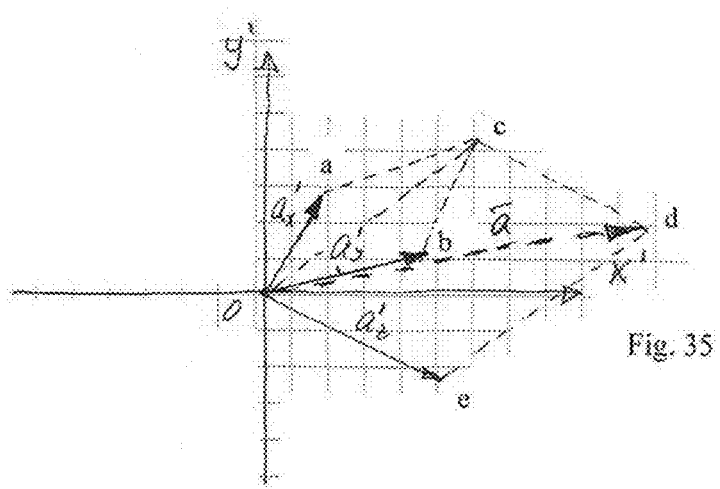
FIG. 35 further illustrates projections of the vectors of acceleration of the ASHM accelerometer onto the plane x'-O-y' and determination of the global vector of acceleration A in such plane.

FIG. 35 further illustrates projections of the vectors of acceleration of the ASHM accelerometer onto the plane X'-0-Y' and determination of the global vector of acceleration $\overline{a}$ in such plane, where $a'_x$, $a'_y$, and $a'_z$ are projection of $\alpha_x$, $\alpha_y$, and $\alpha_z$ respectively, onto a horizontal plane; where $a'_x$ is a vector from 0 to a; $a'_y$ is from 0 to b; $a'_z$ is from 0 to e; and global acceleration vector in the horizontal plane $\overline{a}$ is from 0 to d.

Figure 36:
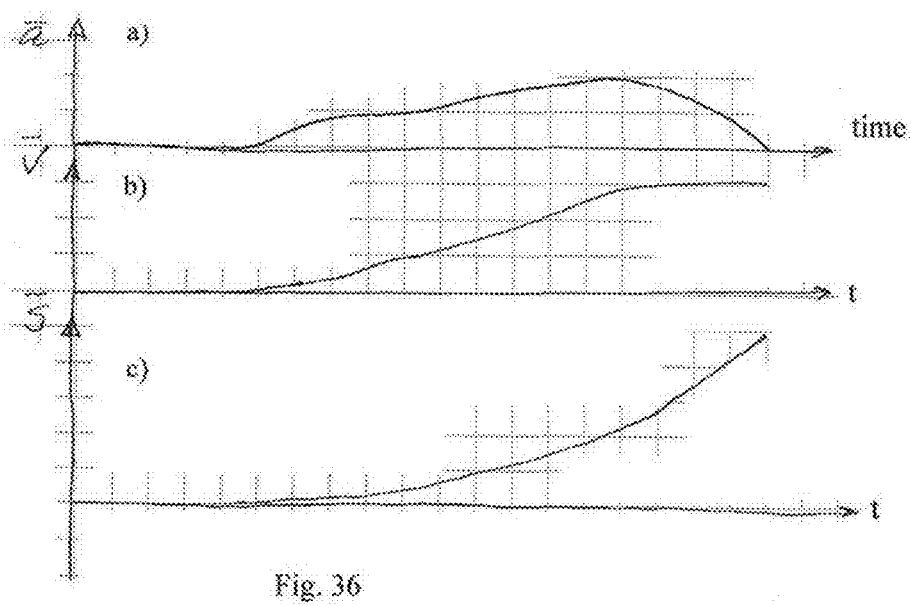
FIGS. 36$a$), 36$b$) and 36$c$) illustrate the effect of consecutive integration of the acceleration vector in said horizontal plane for determination of the velocity and distance of travel of the aircraft, vehicle or a marine vessel.

FIGS. 36a), 36b) and 36c) illustrate the effect of consecutive integration of the acceleration vector in the horizontal plane for determination of the velocity and distance of travel of the aircraft, vehicle or a marine vessel. FIG. 36a) shows a plot of global acceleration $\overline{a}$ over time. FIG. 36b) shows velocity $\overline{v}$, where $\overline{v}=\int_0^t \overline{a}dt$; and FIG. 36c) shows distance $\overline{S}$, where $\overline{S}=\int_0^t \overline{v}dt$.

FIG. 37 illustrates an example of ASHM 10 applied to a cantilever beam 55 for detection of the displacement at point of application of the ASHM 10, where one end of the cantilever beam 55 is stational and the other end is free for movement.

FIGS. 38a) and 38b) illustrate the variation of the displacement along the beam length in z direction when a displacement $\Delta$ is applied to the free end of the beam. FIG. 38a) shows a right end of the cantilever 55 being stational, and left end of the cantilever 55 being free for movement, where broken lines shows the maximum possible displacement of the cantilever 55. FIG. 38b) shows variation of displacement over the length L of the cantilever 55, which, for a given loading case, can be deducted from the measured displacement at the point of application of ASHM.

FIGS. 39a) to 39d) illustrate a graphical representation of a method for calculating displacement based on acceleration measured/sensed by an accelerometer. FIG. 39a) shows changes of an acceleration $\alpha_z$ over time. First, ASHM would determine a base line acceleration due to gravity, $\alpha_g$. Second, acceleration of gravity $\alpha_g$ is subtracted (or filtered out using conventional digital or analog filtering techniques) from the acceleration $\alpha_z$ (as shown in FIG. 39b). Third, ASHM would calculate velocity $v_z=\int_0^t(\alpha_z-\alpha_g)dt$. Then, fourth, calculate displacement point of application of ASHM, $\Delta_z=\int_0^t v_z dt$.

FIG. 40 illustrates data structures/tables for a composition of the individual fatigue containing count per Rain-Flow algorithm or alike (per flight or trip, for instance), which may be captured in individual rain-flow table(s) 100 and a global fatigue table being a sum of the individual tables, which may be captured in the global rain-flow table 110. For example, individual rain-flow tables 100 are tagged with time or per flight T1, T2, T3, T4, . . . Tn. Global rain-flow table 110 is the sum of all bins with the same range-mean values, i.e. $\Sigma_{T1}^{Tn}$.

FIG. 41 illustrates typical processing algorithm for determination of ranges and mean values between peaks and valleys of the processed strain signal, where E is strain.

Yet another embodiment of the present invention can provide a processing algorithm allowing for onboard analysis of the data provided by the sensing means in order to reduce the amount of memory needed while providing a complete picture with respect to the history of usage and events necessary for fatigue life prediction and factual load spectrum analysis.

This latter aspect can permit careful prediction of the remaining life of a particular monitored component and can also provide an estimation of the damage that the component has experienced due to overloading during the use of the sensor. Based on this collected data and the associated knowledge that can be inferred therefrom, it can be possible to determine the appropriateness of the overhaul/reinforcement of a component and therefore justify the necessity to replace a component only if real, observed damage has occurred.

In this way, the present invention can allow instrumenting an aircraft or other structure without interference into existing data recording instrumentation due to the autonomous manner that data is acquired. Alternatively, the present invention can be employed to enhance and assist an existing data recording system.

Moreover, constant monitoring of critical points on a structure to track and determine a history of stress and correlating it to the conditions causing it can allow aircraft manufacturers to better predict design parameters and improve the reliability of the systems while keeping the cost of overhauls and repairs or replacements down to a justified minimum.

FIG. 42 illustrates an example of true strain applied in a shape of a pulse where section defined by points a-b indicates loading, section b-c indicates constant strain, section c-d indicates unloading, and section d-e—zero strain.

FIG. 43 illustrates behavior of the strain as read from the strain sensing means in response to the strain applied as shown in FIG. 42, where sections b-c and d-e are affected by creep occurring in layer/s connecting said strain sensing means and the surface of the structure and/or in the material of the structure itself.

FIG. 44 illustrates the amount of strain that needs to be applied on top of the signal received from strain sensing means in order to compensate for the creep (or measurement error).

FIG. 45 illustrates an example of signal from strain sensing means compensated for creep and used for further processing (reflecting true strain).

FIG. 46 shows typical pattern of relative change in strain measurements due to creep over time and under loading at different temperatures, at $T_1$ and $T_2$, where $T_2 > T_1$.

FIG. 47 illustrates the same pattern of change described in FIG. 46 but plotted using semi-log methodology.

FIGS. 48a), 48b), and 48c) present an overall methodology for achieving creep compensation where historical values of measured strain and temperatures (FIG. 48a)) provide for information necessary for determination of compensation value of strain aimed to offset the effects of the creep (FIG. 48 b)) and corrected strain values equal or close to the true strains the structure has historically experienced (FIG. 48 c)).

Figure 49:
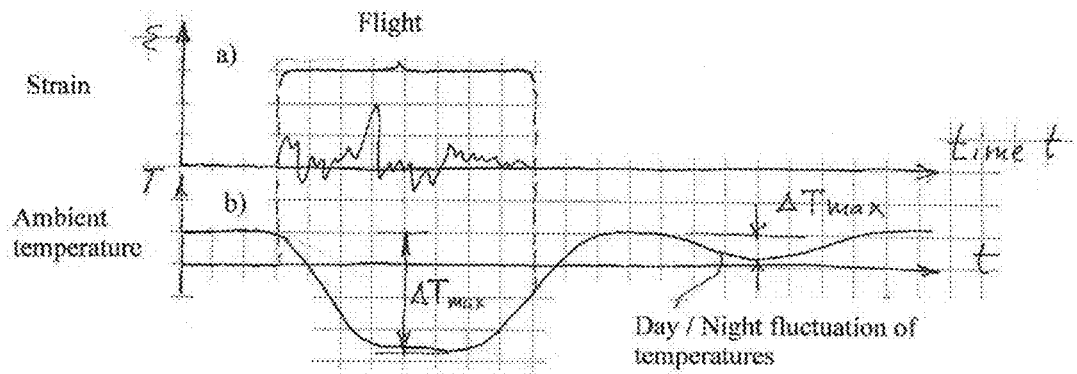
FIGS. 49a) and 49b) illustrates processes of variation of strain and ambient temperature for an aircraft where strain variation typically occurs during a flight (FIG. 49 a)) and ambient temperature variation occurs both, during flight and when the plane is stationary.

FIGS. 49a) and 49b) illustrate plots representing processes of variation of strain and ambient temperature for an aircraft where strain variation typically occurs during a flight (FIG. 49 a)) and ambient temperature variation occurs both, during flight and when the plane is stationary. ASHM may determine, based on correlations between the strain value variation and temperature variation ranges, whether temperature fluctuation is merely based on day/night fluctuation of temperature.

Figure 1:
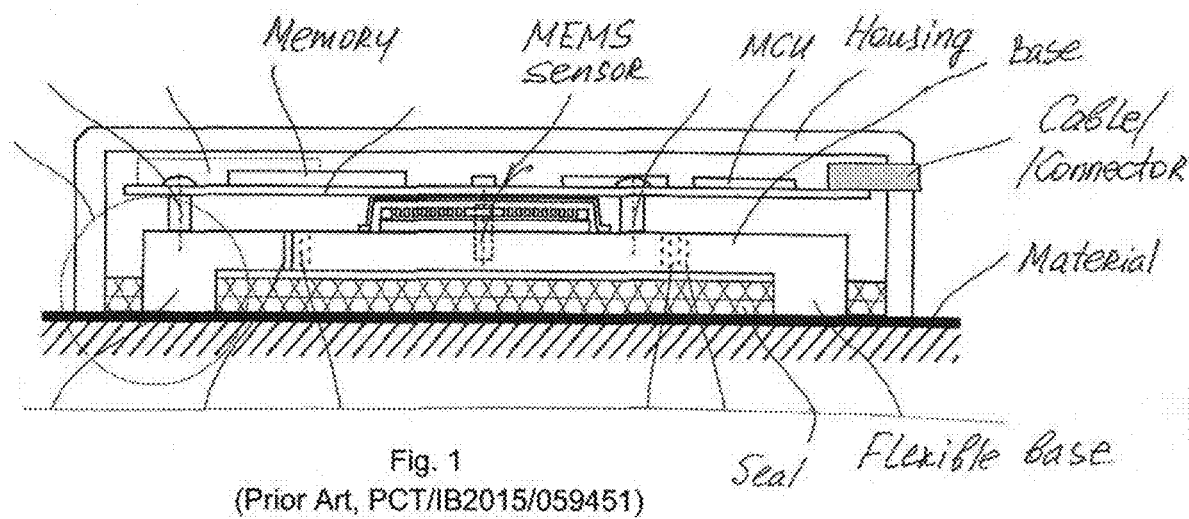
FIG. 1 illustrates a prior art MEMS structural health and usage monitor with strain sensing means composed of MEMS displacement sensor with electro-contact flexible members, deformable base, electronic circuitry and hermetic housing (PCT/IB2015/059451 by Okulov)

Referring to FIG. 1, per prior art (PCT/IB2015/059451) flight event recognition or load exceedance can be used in order to initiate data acquisition only when there is a change in strain thus dramatically reducing power consumption of the device. However, strain variation can happen during aircraft fueling or taxiing and therefore produce data recordings and generation of processed events when the loading is not critical which limits advantages which could have been achieved if a more precise algorithm is provided. In order to produce definite indication of a pre-determined condition multiple inputs from multi-sensing means are desirable.

This accurate assessment of the loading event or condition becomes critical due to the fact that the ASHM 10 of the present invention is using fast speed processor. Given the number of calculations necessary and use of the MCU 20 for excitation of the strain sensory means, communication via serial or parallel interfaces between the MCU, memory and sensory means and also taking into consideration the trend in reduction of overall power consumptions of the state of the art MCUs, it is critical to reduce the overall power consumption of the ASHM 10 below 1.8 mA at 2-3.6 DC supply (<6.5 mW). Given that in a sleep mode the MCU 10 still has to wake up periodically to watch for a condition of, for instance, a flight or a request from the wireless PC based transceiver to download information or change certain settings of ASHM it becomes critical to reduce the number of power consuming electronic components. Thus, although D/A means are part of a typical MCU their power consumption is prohibitive as describe here above. Typical MCU though always has a relatively high frequency clock and timers which provide for a necessary means to convert output of strain sensing means into counts and avoid use of an amplifier and A/D converter customary for currently available commercial solutions.

Figure 8:
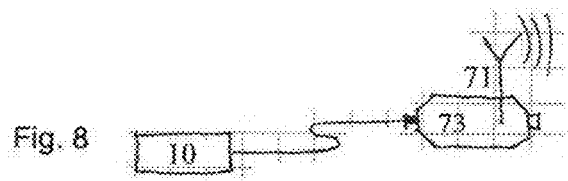
FIG. 8 illustrates the basic configuration where the ASHM is interfaced with a battery and wireless transceiver by a cable or short-range RF or other wireless means.

FIG. 8 illustrates the basic configuration where the ASHM 10 is interfaced with a battery 73 and wireless transceiver 71 by a cable or short-range RF or other wireless means.

Figure 10:
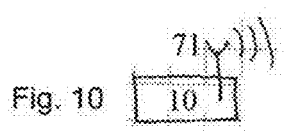
FIG. 10 illustrates another embodiment of the ASHM where wireless interface is integral with the ASHM housing.

FIG. 10 illustrates another configuration of the ASHM 10 where wireless interface 71 is integral with the ASHM housing 40.

Figure 13:
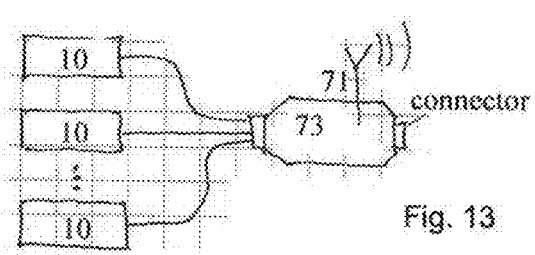
FIG. 13 illustrates an example of network of individual ASHMs connected to a wireless interface and power supply.

FIG. 13 illustrates an example of network of individual ASHMs 10 connected to a wireless interface 71 and power supply 73.

Figure 9:
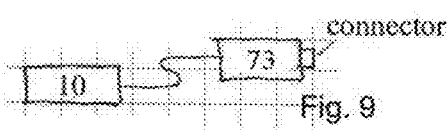
FIG. 9 illustrates a configuration where the ASHM is connected to a modular battery compartment and/or energy harvesting device by a cable.

FIG. 9 illustrates a configuration where ASHM 10 is connected to a modular battery compartment 73 and/or energy harvesting device (not shown) by a cable.

Figure 11:
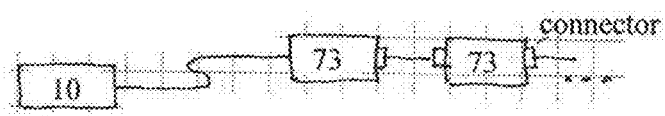
FIG. 11 illustrates yet another configuration where the modular battery and/or wireless communication means are connected in series allowing for extended capacity of the battery, enhanced capabilities (adding functionality like extended memory, implementation of customized algorithms achieved by providing additional processors or MCUs, adding sensing means like corrosive sensors, GPS, etc.) while maintaining flexibility of installation.

FIG. 11 illustrates yet another configuration where ASHM 10 is connected to the modular battery 73 and/or wireless communication means 71 which are connected in series allowing for extended capacity of the battery 73, enhanced capabilities (adding functionality like extended memory, implementation of customized algorithms achieved by providing additional processors or MCUs, adding sensing means like corrosive sensors, GPS, etc.) while maintaining flexibility of installation.

Figure 12:
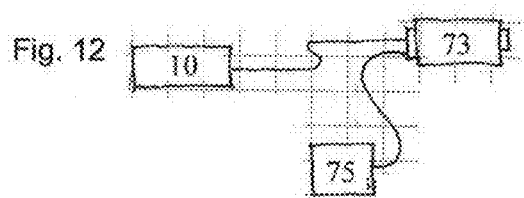
FIG. 12 illustrates the preferred embodiment with a separate energy harvesting module connected to the battery compartment.

FIG. 12 illustrates a separate energy harvesting module 75 connected to the battery compartment 73 for ASHM 10.

Figure 50:
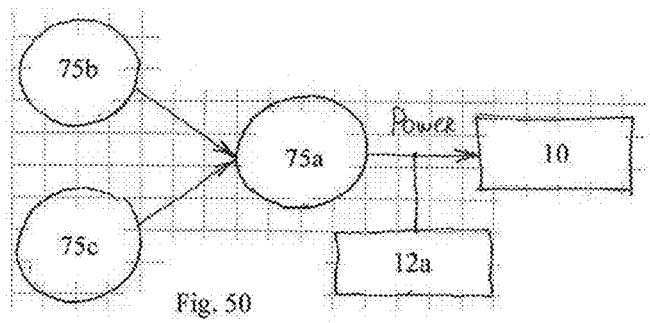
FIG. 50 further illustrates a diagram of the solution related to supplementation of the energy needed for operation of the ASHM derived from energy harvesting means associated with strain AND thermal difference and using energy harvesting device manager (a conventional IC, for instance) for either storing the excess energy in a rechargeable battery or a capacitor or reducing the need for power derived from the battery supplying energy to the ASHM, or any combination of the above.

FIG. 50 illustrates a block diagram of the solution related to supplementation of the energy needed for operation of the ASHM derived from energy harvesting means 75, including, but not limited to strain or piezoelectric energy harvesting module 75b and/or thermoelectric energy harvesting module 75c (Peltier, use of thermal differences for generating energy) and using energy harvesting device manager 75a (a conventional IC, for instance) for either storing the excess energy in a rechargeable battery 12a or a capacitor or reducing the need for power derived from the battery supplying energy to the ASHM 10, or any combination of the above.

Figure 51:
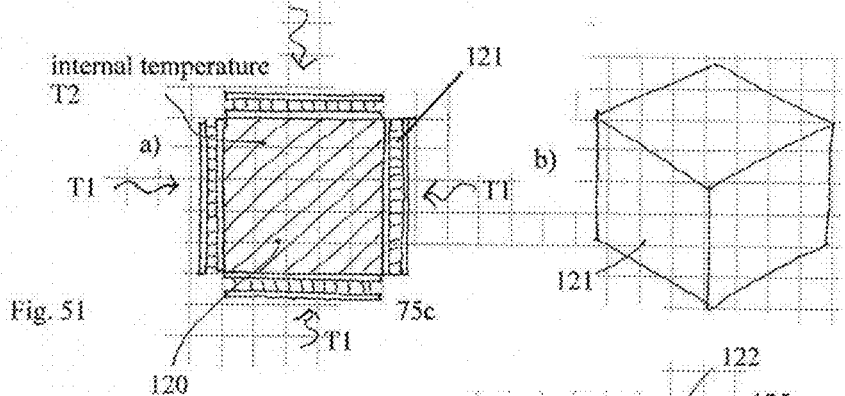
FIG. 51 a) illustrates an example of Thermo-electric energy harvesting device where a high heat capacity material is used for the core of said device and said core is entirely enveloped by Peltier type power generating plates from all sides thus providing for only one path of thermal energy flow due to the difference of temperature between said core and ambient environment.

FIG. 51a) illustrates an example of thermo-electric energy harvesting device 75c where a high heat capacity material is used as a core 120 of said device and said core is entirely enveloped by Peltier type power generating plates 121 from all sides thus providing for only one path of thermal energy flow due to the difference of temperature between said core (or internal temperature) T2 and ambient environment temperature T1. For core 120, there are various high heat capacity materials available. Following is a table summarizing a list thereof:

Material Inner Core Heat Capacity)(J/gC. °
1 Lithium 3.56
2 Beryllium 1.825
3 AlBeMet 1.507
4 Aluminum 0.92
5 Ammonia
4.6
6 Water 4.19
7 Sodium hydrate 3.93
8 Paraffin 2.13

FIG. 51b) illustrates a cubical shape of a core 120 of the thermo-electric energy harvesting module 75c, surrounded by six square Peltier plates 121.

Figure 52:
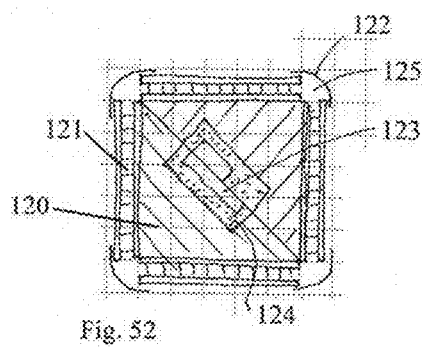

FIG. 52 further illustrates that a core 120, which may have an electronic circuit 123 and/or energy cumulating means (a rechargeable battery 12a (not shown), super capacitor, bank of ceramic capacitors or other means having its own heat capacity properties as a material) and a filler 124 providing for elimination of an empty space inside said core 120. The system further can have sealed corners 122 and low thermally conductive material/means to eliminate or diminish the thermal bridges between sides of the Peltier plates 121 (by applying vacuum, for instance) 125 as well as it can have heat exchange means associated with external or internal sides of Peltier plates 121 or core 120 for enhancing or reduction of thermal transfer between said core 120 and ambient environment (not shown).

According to one particular embodiment of the present invention, the system comprises of processing means for analyzing the data and storing it in non-volatile memory making it possible to provide an output directly used for estimation of the fatigue damage of the component due to the mechanical stresses. The same output can be used to provide for alerts of a particular part approaching or exceeding its fatigue limit.

Yet another possibility is to record and process a predetermined length of events and, if the ASHM was applied to an existing structure (used aircraft, for instance) with certain part of the history of loading missing, it is possible to extrapolate the recorder history into the past and substitute for the missing history of events thus providing for a more accurate assessment of the fatigue life of a structure.

According to another embodiment of the present invention, each sensor comprises multi-sensory means which provide for a minimum of information needed for accurate assessment of the structural health and also for an accurate assessment of the loading or environmental conditions necessary for reducing the overall power consumption.

The following example illustrates in more detail the effect of power consumption on the weight of the batteries. For commercial aircrafts the number of flight hours can reach 7000 a year or more. Thus, within 10 years of recording and processing at, say at envisioned 2 mW of power consumption, the overall amount of power needed will be 2*7000*10=100,000 mW/hour or 100 W/hour. Given that the flight altitude is above 9 km and temperature of the aircraft structure can be below −50° C. the total amount of power needed for one ASHM can actually reach 130 W/h (the battery capacity is reduced at low temperatures). Two primary Lithium cells LS 3360 by SAFT can suffice for such supply and the total weight of the batteries will be within 180 grams which the industry considers to be acceptable.

Thus, the overall reduction of the power consumption of the ASHM can be achieved by the following:
1. Providing multi-sensing means capable of both, providing necessary information for assessment of structural health AND accurate assessment and indication of loading or other meaningful events requiring data recording and processing.
2. Reducing distance from strain sensing mans to the signal processing means thus reducing noise-to-signal ratio and reducing number of electronic components for signal conditioning, filtering, etc.
3. Utilizing MCU time driven components (clock, timer, counter, etc.) instead of amplifiers and A/D converters for strain signal processing.
4. Providing for possibility of utilizing of a combination of a low power energy source harvesting solutions like Piezo-electric and Thermal generators in order to produce an additional energy from both conditions: 1) Where the structure is loaded (from variation of strains and ambient differential temperatures), and 2) When the structure is not loaded (from variation of ambient differential temperatures).

Yet in another embodiment of the present invention, the system comprises RF interface for transmitting the data wirelessly and on request from the remote means, such as, for example a PC, a hand-held transceiver, an Android device or an aircraft data logger. In addition, and in order to avoid RF communication when the aircraft is in flight a logic combination of meeting two conditions can be used to enable such communication securely: 1) An encrypted request message is received from a groundbased transceiver AND, 2) The ASHM processor indicates that the aircraft is not in flight. It should be understood that the above combination of these logical conditions is an example only and that a variety of other inputs from said multi-sensing means or processed events or their logical combinations can be used for permitting or prohibiting wireless communication with the ASHM.

According to at least one embodiment of the present invention, the strain sensing means are mechanical deformation sensors employing semiconductor strain gauges, more particularly formed in a rosette configuration in order to completely assess strain distribution at the point of application of the ASHM or at the point of application of the extension of the ASHM strain sensing means, for assessment of strain in hot temperature zones, for instance.

According to at least one embodiment of the present invention, the strain sensing means are comprised of the MEMS (electro-contact type described in prior art by P. Okulov, capacitance or other type) or piezo-resistive type comprising semiconductor material or conventional resistive strain gauges. Yet further according to the object of the present invention, it provides a rosette of at least three strain gauges positioned at angles relative to each other in the plane of the measured strain (or, for 3D strain measurements, the strain sensing means can be also applied to other than structure surfaces' planes). Examples of 2D (3-axial) strain measurement arrangements are shown in FIGS. 19 and 20.

FIG. 19 illustrates the configuration of the strain sensing means per a preferred embodiment of present invention where three piezo-resistive semiconductor or metallic type strain gauges 81 are employed in a rosette configuration on a substrate 80. Each piezo-resistive strain gauge 81 requires a pair of wires 82 for measuring resistance thereof.

FIG. 20 illustrates a variant of the rosette of three-fingered strain gauge 81' on a substrate 80 with simplified configuration by having a common electrode 83 and elimination of the need for two wires for each strain gauge, unlike one shown in FIG. 19. For example, the configuration shown in FIG. 19 requires six (6) wire connections, while the configuration in FIG. 20 requires four (4) wire connections.

The miniature size of the ASHM described herein permits easy integration into an aircraft or other structure. According to at least one embodiment, at least two sensors are arranged to detect the same stress condition at a certain point assuring that in the event of failure of one sensor, the other sensor can still record the stress spectrum.

The present invention can be constructed of any suitable materials. To match better the deformation of the structure caused by temperature, the housing of the sensor can be made of the material providing properties with close coefficient of thermal expansion including resins with glass or other types of filler, composite materials and a variety of other materials that will be readily apparent to the skilled person. In at least one embodiment the deformable bottom of the housing of the ASHM is made of the material with the same temperature coefficient as the material being tested. In addition, in some embodiments the internal thermal sensor can provide for correction of the sensor sensitivity at predetermined intervals.

It is also contemplated that the invention can also provide a method for estimating fatigue of an aircraft component subjected to mechanical stresses using a variety of algorithms for data interpretation, including but not limited to a Rain-Flow algorithm.

According to at least one embodiment of the present invention, the data can be organized in the memory as a table with pre-set number of rows (16-32) for storing range or mean values related to stress fluctuation from peak to valley (or vice versa), and 16-32 columns indicating the range or mean values of stress (from peak to valley or vice versa), two values of absolute maximums of tensile and compressive stress recorded and each cell of the table containing the count of events, preferably with 32 bit (or better) resolution allowing recording of 43 billion counts or more in each cell. As the mean values are at least twice smaller than ranges it is desirable to provide a table with equal resolution of the bins, i.e. the size of a bin (in terms of span of the strain, not counts) for containing counts of mean values should be twice smaller than the size of the bin for containing ranges. The total amount of memory for such tables is in the range of 1.6-11 Kbytes, which allows wireless transmission of all data within very short time. In some embodiments the table can provide complete information on stress spectrum and allow further calculations of the fatigue life and overall loading spectrum. Yet another feature of the present invention is use of multiple tables (per flight, for instance) AND a global table comprising the sum of counts of each individual table to assess individual flight conditions and its effect on overall fatigue damage.

It is contemplated that the use of methods presented herein can allow receiving the final estimate of the fatigue level during routine data acquisition by any suitable type of a portable device operated by a user standing beside (or inside) the aircraft within proximity of the RF transmitter range (typically 10-50 m). It is contemplated that conventional wired interfaces, such as but not limited to USB, I2C, RS-482, "One-Wire"™ or similar interfaces can also be used as will be understood by the skilled person. Due to data organization as disclosed by the present invention and the small size of each individual sensor, a simultaneous acquisition of data from many sensors can be done within a very short period of time. Each sensor can have a unique identification number, its content can be encrypted and use password protection for data retrieval and changes to the sensor data logging/processing mission, which in some embodiments can both be accomplished using wireless communication.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

REFERENCE NUMERAL LIST 10 autonomous structural health monitor (ASHM)
11 battery compartment
11a cover (battery compartment)
12 battery
12a rechargeable battery
20 micro-controller unit (MCU)
20a non-volatile memory/memory
21 3-axis accelerometer
22 gyroscope
23 accelerometer
24 strain gauges/strain sensor
24a digital strain gauge
25 environmental sensor
25a temperature sensor
25b humidity sensor
25c pressure sensor/barometric pressure sensor
25d piezo-electric disk
26 analog electronics/signal conditioner/amps
27 clock
28 strain-to-digital/time
29 power management
30 bus/serial interface (I2C or alike)
31 external interface module (serial or/and parallel)
32 printed circuit board (PCB)
33 heat conductor
34 heat transfer means/bridge
35a cable
35b connector
36 spring loaded contacts
37 contact pads
40 housing
40a housing (flexible housing)
40b housing (rigid)
40c deformable part of the housing
41 cover (housing)
42 flexible substrate
43 opening (hole)
44a no wedge
44b wedge
44c multi-wedge
44d flap
45 adhesive (elastic adhesive)
46 adhesive layer
47 adhesive (structural adhesive)
48 wires
49 additional substrate
50 surface of material under strain (or to be monitored)
55 cantilever beam
60 External sensors
61 high temperature sensor
62 high temperature strain gauge sensor
62a high temperature cable
63 remote strain sensor
64 corrosion sensor
70 External peripherals
71 wireless interface
72 RF/acoustic/optical interface
73 battery
74 battery extension
75 energy harvesting module
75a energy harvesting devices manager
75b piezo-electric energy harvesting module
75c thermoelectric energy harvesting module (Peltier)
76 wired interface (serial/parallel)
77 parallel interface
78 USB interface
79 serial interface
80 substrate
81 piezo-resistive strain gauge sensors
81' three-fingered strain gauge sensor
82 wires
83 common electrode
90 resistive strain gauge
92 amplifying, signal conditioning means
93 A/D converter
94 digital output
94 MOSFET switch
95 comparator
100 individual rain-flow table
110 global Rain-Flow table
120 core of thermo-electric energy harvesting module 121 Peltier plate
122 corner/slide cover
123 electronic management circuit, etc.
124 filler
125 low thermally conductive material

The invention claimed is:

1. An autonomous structural health monitor (ASHM) comprising:
a housing having at least one deformable surface attached to a structure;
a strain sensor per a strain sensing channel that is associated with said at least one deformable surface and measures a strain of said structure;
a temperature sensor for measuring temperature at said at least one deformable surface, said temperature sensor having a thermally conductive connection to said strain sensor;
a micro-controller unit (MCU) that is in communication with said strain sensor through said strain sensing channel and said temperature sensor; and
a non-volatile memory that is in communication with said MCU; and
a power supply including an energy harvesting device, said energy harvesting device comprising a thermo-electric energy generator,
wherein said MCU processes said measured strain from said strain sensor and said measured temperature and calculates the strains free of temperature related errors based on a pre-defined or a learned relationship between said measured strains and said measured temperature,
wherein said pre-defined or learned relationship is stored in said non-volatile memory,
wherein said temperature sensor, said MCU and said non-volatile memory reside in said housing, and
wherein said thermo-electric generator includes several Peltier type plates entirely surrounding a mass of a high heat capacity material and providing an output voltage based of differential temperature between ambient environment temperature and temperature of said mass.

2. The ASHM of claim 1 wherein said housing is hermetic and said deformable surface is integral with the housing.

3. The ASHM of claim 1 wherein said housing is hollow and contain a printed circuit board with electronic components secured against housing using deformable material.

4. The ASHM of claim 1 wherein said strain sensor comprises a charge-based strain sensor circuit comprising: a resistive strain gauge; a capacitor, having a first terminal and a second terminal; a comparator; and an excitation pulse generator for generating an excitation pulses repeating at pre-determined sampling rate; wherein said resistive strain gauge and said capacitor are connected in series with said excitation pulse generator, and said comparator is connected between said resistive strain gauge and said capacitor.

5. The ASHM of claim 4 wherein said resistive strain gauge comprises a MEMS sensor.

6. The ASHM of claim 4 wherein said resistive strain gauge is a semiconductor strain gauge.

7. The ASHM of claim 1 wherein said MCU has a sleep mode for saving a power consumption, and transits out from said sleep mode based on a predetermined condition.

8. The ASHM of claim 7 wherein said predetermined condition is selected from the group consisting of: a flight of a fixed wing or a rotary wing aircraft or a drone, a launch of a reusable spacecraft, a trip of a vehicle or a marine vessel, loading of a structure, pressurizing of a vessel or pipe, exceedance of a pre-determined conditions related to loads or environmental factors.

9. The ASHM of claim 1 further comprises one or more of an accelerometer, a gyroscope, a humidity sensor, a pressure sensor, and a GPS.

10. The ASHM of claim 1 wherein said temperature sensor has a thermal bridge for providing a heat transfer link between said strain sensor and said temperature sensor.

11. The ASHM of claim 1 wherein said strain sensor include a rosette of strain or displacement sensors positioned at angles and providing for strain sensing in several directions necessary for assessment of planar or 3D strains including principal strains and angles between principal strains and axis of said housing.

12. A method of calibration of said strain sensor of said ASHM as recited in claim 1, detachably mounting said ASHM on a surface of a calibration member being under known strain and temperature condition, at least two different temperatures that are representative of an operational temperature range, making at least two measurements from said strain sensor at two different strain conditions that have corresponding known strain values; processing said measurements from said strain sensor by comparing with said corresponding known strain values to determine a correlation factor for compensating temperature related errors.

13. The method of calibration of claim 12, wherein said ASHM is adhered to said calibration member using an adhesive similar to the adhesive to be used in anticipated working conditions, said adhesive is cured to a temperature above the maximum temperature anticipated for said operational conditions and after completion of calibration steps the ASHM is detached from said calibration member.

14. The method of claim 13 wherein said calibration member has a surface with a mirror like finish to assist detachment of the ASHM using bending of said calibration member or wedging the ASHM from said surface or both.

15. The method of claim 12 wherein said calibration member is made of a material with the same or similar thermal expansion coefficient as the material of a structure to be provided with said ASHM for data acquisition and processing.

16. The ASHM of claim 1 wherein said MCU processes said measured strain by compensating creep in an adhesive layer between said strain sensor and said structure based on historical values of strains, temperature and times elapsed from a certain strain condition and temperature till present moment wherein such compensation values of creep are expressed in strain values to be added or subtracted from measured strain value in present moment.

17. The ASHM of claim 9 wherein said MCU calculates one or more of the following data: principal strain or stresses, angle between principal strain and axis of said housing, acceleration, velocity, displacement, distance, position, time, relative humidity, Dew point, altitude, pressure, frequency spectrum, fatigue damage or Rain-Flow table, raw data from said plurality of sensing means, corrosion factor and any other parameter valuable for an assessment of structural health.

18. The ASHM of claim 1, wherein said MCU determines said learned relationship between said measured strains and said measured temperature using neural network operators and approach.

19. The ASHM of claim 16 wherein said MCU stores processed measured strain as a global dataset and as per-operational condition dataset.

20. The ASHM of claim 1 further comprising a power supply includes at least one primary or rechargeable battery or capacitive means which is integral with said housing or modular.

21. The ASHM of claim 1, wherein said high heat capacity material is selected from the group consisting of: lithium, beryllium, AlBeMet, aluminum, ammonia, water, sodium hydrate, and paraffin.

22. The ASHM of claim 1 further comprising a clock oscillator for said MCU to assure that all necessary calculations related to assessment of strain are completed within the time needed for taking one sample of said strain.

23. The ASHM of claim 1, wherein said housing comprises a wedge extending from said housing at a perimeter of the said deformable surface for receiving an adhesive for attaching to said structure.

24. The ASHM of claim 1, wherein said deformable surface extends outwardly along said structure from said housing for receiving an adhesive for attaching to said structure.

25. The ASHM of claim 1, wherein said strain sensor is adhered to said structure.

26. The ASHM of claim 1, wherein said strain sensor is adhered on said at least one deformable surface.

27. The ASHM of claim 26 further comprising an additional substrate for attached over said strain sensor by an adhesive.

28. The ASHM of claim 1 further comprising a three-axis accelerometer in communication with said MCU for detecting an acceleration, a velocity and a displacement of said structure.

29. The ASHM of claim 25, wherein said MCU further determines a distance of a movement of said structure.

30. An autonomous structural health monitor (ASHM) comprising:
a housing having at least one deformable surface attached to a structure;
a strain sensor per a strain sensing channel that is associated with said at least one deformable surface and measures a strain of said structure;
an environmental sensor for measuring an environmental condition;
a micro-controller unit (MCU) that is in communication with said at least one strain sensor through the strain sensing channel and said environmental sensor;
a non-volatile memory that is in communication with said MCU; and
a power supply including an energy harvesting device, said energy harvesting device comprising a thermo-electric energy generator,
wherein said MCU processes said measured strain from said strain sensor associated with said environmental condition from said environmental sensor for structural health assessment and stores said processed strain in said non-volatile memory,
wherein said environmental sensor, said MCU and said non-volatile memory reside in said housing, and
wherein said thermo-electric generator includes several Peltier type plates entirely surrounding a mass of a high heat capacity material and providing an output voltage based of differential temperature between ambient environment temperature and temperature of said mass.

31. The ASHM as recited in claim 30, wherein said environmental sensor comprises one or more of temperature sensor, relative humidity sensor, ambient pressure sensor, corrosion sensor and gas analyzer, and said environmental condition comprises measurement from said one or more of temperature sensor, relative humidity sensor, ambient pressure sensor, and gas analyzer.

32. The ASHM as recited in claim 31 further comprises one or more of an accelerometer, a gyroscope and a GPS.

* * * * *